United States Patent [19]

Saylor

[11] E Patent Number: Re. 32,776

[45] Reissued Date of Patent: Nov. 1, 1988

[54] PIGGY BACK ROW GRABBING SYSTEM

[75] Inventor: Richard Saylor, Monsey, N.Y.

[73] Assignee: IDR, Incorporated, Farmingdale, N.Y.

[21] Appl. No.: 498,971

[22] Filed: May 27, 1983

Related U.S. Patent Documents

Reissue of:

[64] Patent No.: 4,032,972
Issued: Jun. 28, 1977
Appl. No.: 699,088
Filed: Jun. 23, 1976

[51] Int. Cl.[4] ..... H04N 7/087; H04N 7/18

[52] U.S. Cl. ..... 358/142; 358/86; 358/147

[58] Field of Search ..... 358/86, 142, 903

[56] References Cited

U.S. PATENT DOCUMENTS 3,602,891 8/1971 Clark .
3,982,065 9/1976 Barnaby .
3,993,864 11/1976 Pye .

FOREIGN PATENT DOCUMENTS 2058681 9/1973 Fed. Rep. of Germany .

*Primary Examiner*—Howard W. Britton
*Attorney, Agent, or Firm*—Stiefel, Gross, Kurland & Pavane

[57] ABSTRACT

A common channel video communication system for providing a piggy back transmission television field comprising a plurality of television video scan lines over the common channel. The television field is comprised of both at least one video displayable row of video data characters contained in a pseudo video scan line occupying one of the plurality of television video scan lines and normal television video displayable information occupying the balance of the plurality of the television video scan lines. The common channel provided piggy back transmission television fields enable the provision of conventional television as well as real time updateable row grabbed information.

26 Claims, 13 Drawing Sheets

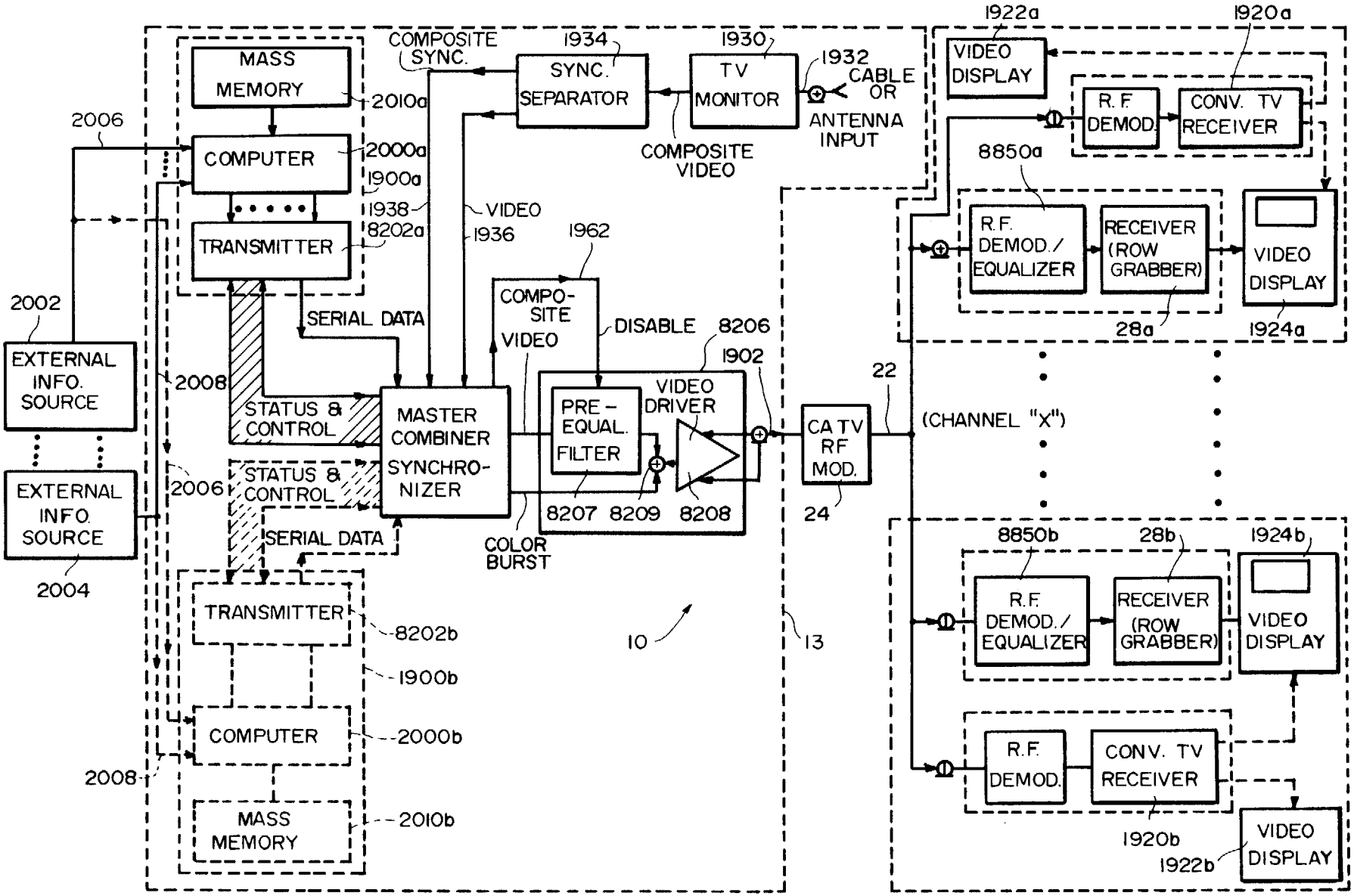
FIG. 1
1920a
CONV. TV RECEIVER
R.F. DEMOD.
VIDEO DISPLAY
1922a
8850a
RECEIVER (ROW GRABBER)
R.F. DEMOD./ EQUALIZER
28a
1924a
(CHANNEL "X")
1924b
28b
8850b
1920b
1922b
22
CATV RF MOD.
24
13
10
1932
CABLE OR ANTENNA INPUT
1930
TV MONITOR
COMPOSITE VIDEO
1934
SYNC. SEPARATOR
COMPOSITE SYNC.
VIDEO
1936
1962
COMPO-SITE VIDEO
DISABLE
8206
1902
VIDEO DRIVER
8208
PRE-EQUAL. FILTER
8207
8209
COLOR BURST
MASTER COMBINER
SYNCHRO-NIZER
2010a
2000a
1900a
1938
8202a
SERIAL DATA
MASS MEMORY
COMPUTER
TRANSMITTER
STATUS & CONTROL
2008
2006
8202b
1900b
2000b
2010b
EXTERNAL INFO. SOURCE
2002
2004

DETAIL BLOCK DIAGRAM AT TYPICAL TRANSMITTER PORTION OF CABLEHEAD OF FIG. 1

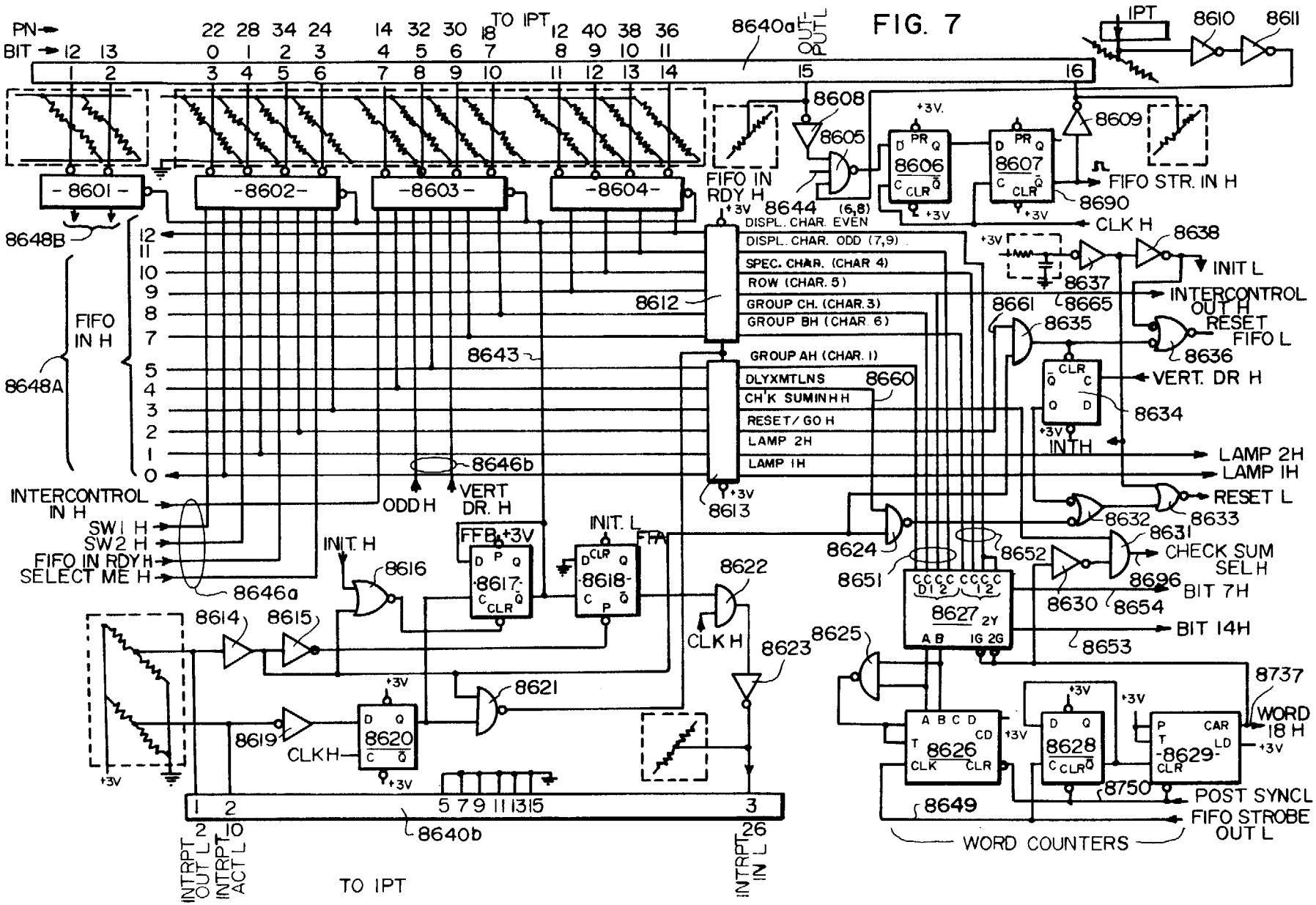
FIG. 7
PN
BIT
8648B
8648A
FIFO IN H
INTERCONTROL IN H
SW1 H
SW2 H
FIFO IN RDY H
SELECT ME H
8601
8602
8603
8604
TO IPT
8640a
8640b
8646a
8646b
8614
8615
8616
8619
8620
8621
8622
8623
8624
8625
8626
8627
8628
8629
8630
8631
8632
8633
8634
8635
8636
8637
8638
8605
8606
8607
8608
8609
8610
8611
8612
8613
8617
8618
8643
8644
8649
8650
8651
8652
8653
8654
8660
8661
8665
8690
8696
8737
IPT
FIFO STR. IN H
CLK H
INIT L
INTERCONTROL OUT H
RESET FIFO L
VERT. DR H
LAMP 2H
LAMP 1H
RESET L
CHECK SUM SEL H
BIT 7H
BIT 14H
WORD 18 H
POST SYNCL
FIFO STROBE OUT L
WORD COUNTERS
FIFO IN RDY H
DISPL. CHAR. ODD (7,9)
SPEC. CHAR. (CHAR 4)
ROW (CHAR. 5)
GROUP CH. (CHAR. 3)
GROUP BH (CHAR 6)
GROUP AH (CHAR. 1)
DISPL. CHAR. EVEN (6,8)
DLYXMTLNS
CH'K SUMIN H H
RESET/GO H
LAMP 2H
LAMP 1H
INIT. L
VERT DR. H
ODD H
INIT H
INTRPT IN L 26
INTRPT OUT L 2
INTRPT ACT L 01
TO IPT

CABLEHEAD WAVEFORMS

PIGGY BACK ROW GRABBING SYSTEM

Matter enclosed in heavy brackets [ ] appears in the original patent but forms no part of this reissue specification; matter printed in italics indicates the additions made by reissue.

CROSS-REFERENCE TO RELATED APPLICATIONS

This application is related to commonly owned U.S. Pat. No. 3,889,054, issued June 10, 1975, and is an improvement on the row grabbing system described therein; and is related to the following commonly owned copending U.S. patent applications: "Information Retrieval System Having Selectable Purpose Variable Function Terminal", filed Sept. 10, 1975, and bearing U.S. Ser. No. 611,927, by *now U.S. Pat. No. 4,064,490, issued Dec. 20, 1977,* Robert H. Nagel; "Row Grabbing Video Display Terminal Having Local Programmable Control Thereof", filed Apr. 23, 1976, and bearing U.S. Ser. No. 679,558, *now U.S. Pat. No. 4,135,213 issued Jan. 16, 1979,* by Leonard Wintfeld and Robert H. Nagel; "Improved Row Grabbing System", filed Sept. 10, 1975, and bearing U.S. Ser. No. 611,843, *now U.S. Pat. No. 4,042,958, issued August 16, 1977,* by Robert H. Nagel and Richard Saylor; "Interface For Enabling Continuous High Speed Row Grabbing Video Display With Real Time Hard Copy Print Out Thereof", filed Apr. 23, 1976, and bearing U.S. Serial No. 679,907 *now U.S. Pat. No. 4,148,066, issued April 3, 1979,* by Richard Saylor; "Digital Video Signal Processor with Distortion Correction", filed Apr. 23, 1976, and bearing U.S. Ser. No. 679,909, *now U.S. Pat. No. 4,199,656, issued April 22, 1980,* by Richard Saylor; and "Phase Locked Loop For Providing Continuous Clock Phase Correction", filed Apr. 23, 1976, and bearing U.S. Ser. No. 679,701, *now U.S. Pat. No. 4,129,748, issued Dec. 12, 1978,* by Richard Saylor; the contents of all of which are hereby specifically incorporated by reference herein.

BACKGROUND OF THE INVENTION

1. Field of the Invention

The present invention relates to video communication systems in which individual frames may be grabbed for video display thereof.

2. Description of the Prior Art

Video communication systems in which the individual frames may be grabbed for video display are well known, such as the system disclosed in U.S. Pat. No. 3,740,465, or a system employing the Hitachi frame grabbing disc. These prior art systems such as the one disclosed in U.S. Pat. No. 3,746,780 are normally two-way request response systems requiring the user to request information by the dialing of a specific digital code which is uniquely assigned to each frame. However, such systems normally grab a group of frames for storage and then subsequently select the individual frame for display out of the group of grabbed frames as opposed to instantaneously selecting a single frame in real time. Furthermore, such prior art systems do not provide for real time updating of the grabbed video frame. In addition, some such prior art frame grabbing systems, such as the type disclosed in U.S. Pat. No. 3,397,283, are normally capable of only grabbing the next immediate signal in response to the provision of a starter signal or, as disclosed in U.S. Pat. No. 3,051,777, utilize a counter for frame location which must be reset to the beginning of a tape for video tape supplied information in order to locate a selected frame to be grabbed. These systems are not applicable in a real time frame grabbing environment. Similarly, other typical prior art frame grabbing systems, such as disclosed in U.S. Pat. Nos. 3,695,565; 2,955,197; 3,509,274; 3,511,929 and 3,582,651, cannot be utilized in a real time frame grabbing environment, such as the one in which the video information associated with the grabbed frame is capable of being continuously updated. Accordingly, presently available prior art frame grabbing digital systems familiar to the Inventor, other than commonly owned U.S. Pat. No. 3,889,054, are not capable of easily locating a frame to be grabbed in real time nor of being able to continuously update such a grabbed frame in real time.

Video communication systems in which the signal being transmitted is digitized are also well known. For example, U.S. Pat. No. 3,743,767 discloses a video communication system for the transmission of digital data over standard television channels wherein the digital data is transmitted in a conventional television scan line format through conventional television distribution equipment. However, such a prior art communciation system merely digitizes one television scan line at a time for distribution to a video display terminal on a bit-by-bit basis in a line, 84 bits of information being provided per television scan line. Furthermore, such a prior art system is not transmission selectable by every display terminal nor is the data for a displayable video row packed into a selfcontained pseudo video scan line information packet. Thus, there is no significant increase in the data transmission rate resulting from such a prior art video communication system. Similarly, U.S. Pat. Nos. 3,061,672 and 3,569,617 and German Pat. No. 2,307,414 are examples of other prior art video communication systems in which television signals are digitized without any significant resultant compression in data transmission time. Furthermore, these other prior art systems require special distribution circuitry. In addition, prior art video communication systems in which a digital television signal is transmitted do not sufficiently isolate the individual rows comprising a frame so as to provide satisfactory noise immunity between these rows nor is there satisfactory data compression in the transmission time of the video information in such prior art systems now satisfactory distortion compensation.

Furthermore, prior art row grabbing or frame grabbing video communication systems utilizing cable, for example, generally concern themselves with a single purpose cable channel for providing a video display of the "grabbed" data. Thus, although there are prior art "piggy-back" video communication systems, that is, systems in which a single line of digital data is transmitted simultaneously with normal television picture video, such as disclosed in British Pat. Nos. 1,163,016, issued Sept. 4, 1969; 1,132,303, issued Oct. 30, 1968 and 1,222,591, issued Feb. 17, 1971; and U.S. Pat. No. 3,927,250, issued Dec. 16, 1975; there are no satisfactory row grabbing video communication systems known to the Inventor employing a dual purpose cable channel for enabling the provision of conventional television as well as real time updateable row grabbed information in which every digital data packet of a piggy-back transmission is completely self-contained, such as in a pseudo video scan line, and includes all address functions required whereby the system is independent of the grabbable row transmission rate, nor are such systems which are known to the Inventor capable of maintaining phase lock to a single start bit.

These disadvantages of the prior art are overcome by the present invention.

SUMMARY OF THE INVENTION

A common channel video communication system for providing piggy back transmission television fields comprising a plurality of television video scan lines over a common channel for enabling the provision of conventional television as well as real time updateable row grabbed information is provided. The television fields are comprised of both at least one displayable row of video data characters contained in a pseudo video scan line occupying one of the plurality of television video scan lines of the field and normal television video displayable information occupying the balance of the television video scan lines of the field. A plurality of pseudo scan lines contained in a plurality of television fields may be combined after reception to provide a selectable grabbed frame of continuously transmittable information which is updateable in real time on a displayable video row-by-row basis. The system comprises means for providing the television video scan lines comprising the normal television video information, such as from a television monitor from which the composite sync portion of the television signal is separated from the picture or video portion before subsequent provision thereof to a means for combining and interleaving the normal television video containing television video scan lines with the pseudo video scan line containing television video scan lines of the field. This combining and interleaving means preferably includes means for inserting both sync information and start bit pulses in each of the television video scan lines of the field for providing composite television video scan lines to the common channel television distribution system. These pseudo video scan lines have a television video scan line format and are capable of comprising a complete self-contained packet of digital information sufficient to provide an entire displayable row of video data characters, the displayable row comprising a plurality of television video scan lines although the transmitted pseudo video scan line only occupies one television video scan line of the transmitted field. The pseudo video scan line has an associated transmission time equivalent to that of a television video scan line and the packet of digital information comprises at least address information for the displayable row and data information for the displayable characters in the displayable row, with the displayable row being capable of providing a continuous video display of a selectable grabbed row of video information on a video display means from continuously transmitted video information.

The start bit pulse inserted in each of the composite television video scan lines of the field is utilized to provide timing and phase adjustment for a phase locked loop contained in a row grabbing receiver terminal which enables display of the row grabbed information in order to provide a reset signal for resetting the processing portion of this receiver in response to detection of the start bit. In addition, the receiver contains gating for passing solely the information portion of the pseudo video scanlines for further processing to provide the row grabbed display while utilizing the start bit contained in each of the television video scan lines of the field of the aforementioned synchronization of the receiver, whether or not a pseudo video scan line is being received.

The pseudo video scan line signal as well as the various start bit pulses are preferably located outside of the normal television receiver display mask so that they do not appear on the screen of a conventional television receiver which is displaying the normal television video information portion of the piggy back television transmission. In such an instance, separate display devices are employed in connection with the common television channel for separately displaying the row grabbed information and the conventional television information. However, if desired, both portions of the piggy back television transmission may be displayed on a common video display device, such as by employing a split-screen display.

BRIEF DESCRIPTION OF THE DRAWINGS

FIG. 1 is a system block diagram of the preferred embodiment of the piggy back row grabbing system of the present invention;

FIGS. 7 through 9 taken together comprise a logic schematic diagram of the typical transmitter portion of FIG. 6;

Figure 2:
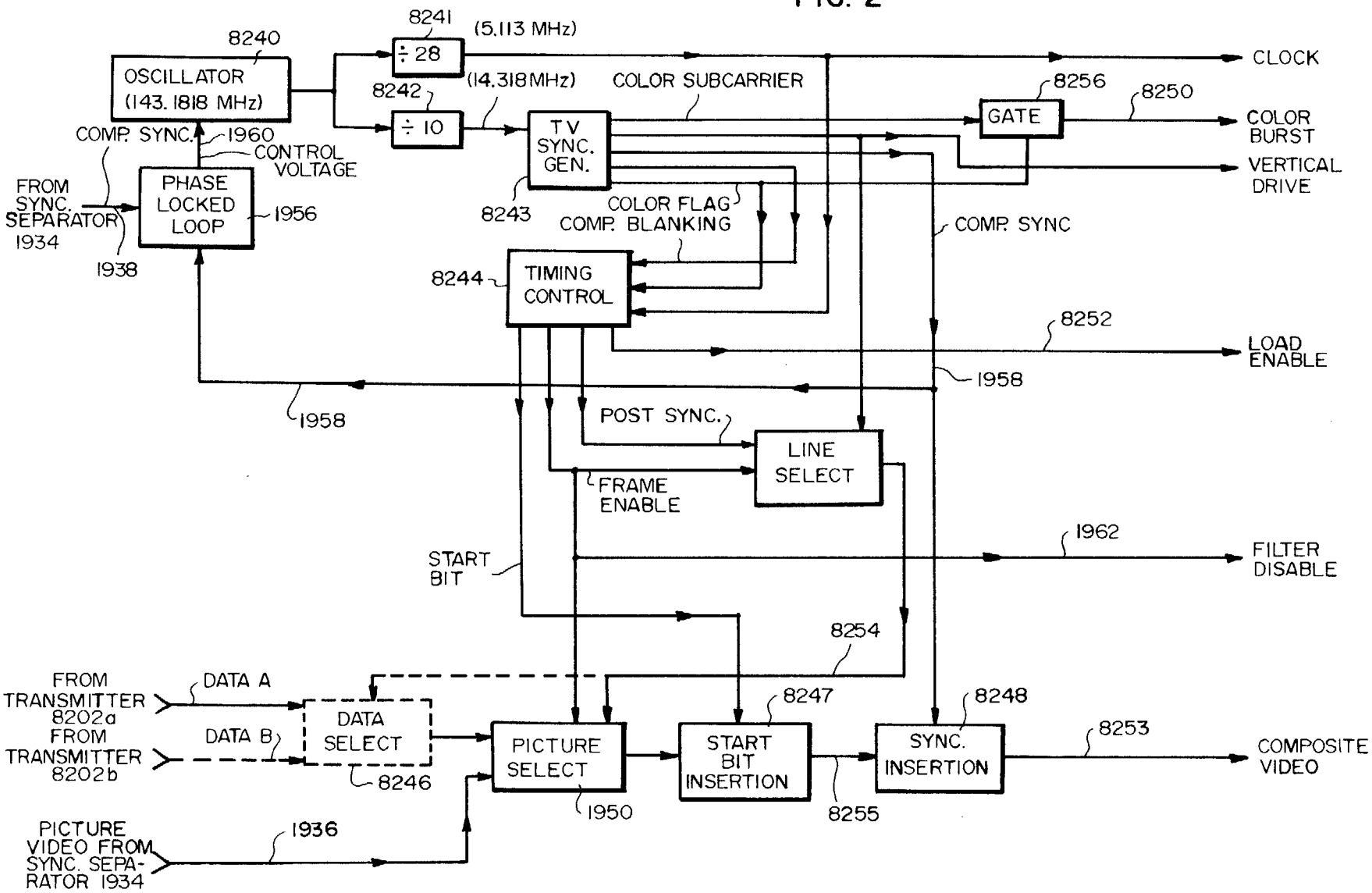
FIG. 2 is a more detailed block diagram of the master combiner synchronizer portion of the system of FIG. 1.

DETAILED DESCRIPTION OF THE PREFERRED EMBODIMENTS General System Description

The piggy back row grabbing system of the present invention, generally referred to by the reference numeral 10, as shown in block in FIG. 1 which includes a block diagram of the preferred cable head, generally referred to by the reference numeral 13, of the present invention. The cable head 13 is the system for providing the pseudo video scan lines of the type described in commonly owned copending U.S. patent application Ser. No. 611,843, filed Sept. 10, 1975 and entitled "Improved Row Grabbing System," *now U.S. Pat. No.*

*4,042,958, issued August 16, 1977,* the contents of which are specifically incorporated by reference herein, this system being a further improvement on the system described in the aforementioned copending patent application, as well as being the preferred system for combining a conventionally provided television transmission therewith so as to ultimately provide a piggy pack transmission of digital data along with normal TV picture data over a conventional single normal television channel, as will be described in greater detail hereinafter, such as an existing CATV channel. Preferably, the digital data contained in the pseudo video scan line portion of the piggy back transmission TV operation to transmitter portion 8202a which shall be described in greater detail hereinafter with reference to FIGS. 1, 3, 6, 7 and 8. The transmitter portion 8202a preferably provides both serial data information and status and control information to a preferred master combiner and synchronizer portion 8204, with the status and control information being bidirectional, that is transmitted to and from master combiner and synchronizer portion 8204, whereas the serial data information is unidirectional only, that is, it is only transmitted to master combiner and synchronizer portion 8204, both being provided from the transmitter portion 8202a to the master combiner and synchronizer portion 8204 in the presently preferred embodiment of the present invention. As will be described in greater detail hereinafter, with reference to FIGS. 3 and 4, the master combiner and synchronizer portion 8204 preferably combines the pseudo video scan line information transmitted from computer 2000a to generate a pseudo video scan line output for the desired number of TV scan line positions which are to contain such digital data in the TV field and combines this digital data containing pseudo video scan line or lines with the normal TV scan lines of this TV field which contain the normal TV picture data to provide the piggy back row grabbing transmission signal. This is preferably accomplished by the master combiner and synchronizer portion 8204, as will be described in greater detail hereinafter with reference to FIGS. 3 and 4, by the master combiner and synchronizer portion 8204 preferably connecting the normal TV picture data or video to the output data line 1902 during the time that digital data is not enabled so that a conventional composite video signal portion is provided which contains the normal TV picture information, while preferably enabling digital data for one or a few TV scan lines (scan line positions) towards the end of the vertical period during which the pseudo video scan lines are connected to or provided from the output data line 1902 over the same conventional TV channel as the aforementioned normal TV picture data. If the aforementioned dual interleaved transmission scheme is utilized, then the master combiner and synchronizer portion 8204 would also preferably place packets of digital information comprising a pseudo video scan line from one computer, for example computer 2000a, on odd televison scan line positions while placing packets of digital information comprising a pseudo video scan line provided from the other computer, such as computer 2000b by way of example, on even television scan line positions during the interval in the TV field when digital data was enabled, with both the odd and even television scan lines being combined to comprise the single transmitted composite pseudo video scan line output of master combiner and synchronizer portion 8204 which pseudo video scan line may preferably each comprise a total of 13 displayable television scan lines on a row grabbing terminal, such as the terminal described in U.S. Pat. No. 3,889,054. In such a dual interleaved transmission system, if either or both computers 2000a and 2000b stop sending packets of such digital information, in the interleaved mode, their respective associated or assigned scan line positions in the output portion 8204 preferably remain video "black". If either the odd or even transmission of such information, from either computer 2000a or 2000b, respectively, is turned off or not employed, as presently preferred, the system 10 will operate with a single computer 2000a in the manner described in the aforementioned copending patent application U.S. Ser. No. 611,843, *now U.S. Pat. No. 4,042,958,* is such interleaved transmission is not desired. Furthermore, if such a dual interleaved transmission system is employed for reliability, if one of the computers 2000a or 2000b becomes inoperable, in which instance, as will be described in greater detail hereinafter, the retrieval or access rate of the information becomes halved as compared to the rate associated with the interleaved transmission, it will readily operate with solely the other computer. It should be noted that if the system 10 does not employ interleaved transmission, as presently preferred, then both the desired odd and even scan line positions are preferably used by the odd and even scan line positions are preferably used by the single computer 2000a for placing of the packets of digital information comprising the pseudo video scan line thereon. However, if the interleaved transmission provided from the two computers 2000a and 2000b which provide identical information preferably 180° out of phase is employed, the access time for this information would preferably be at twice the rate obtained from the use of a single computer although since it is a piggy back transmission of only one or a few pseudo video scan lines, this increase in access time might not be meaningfully noticeable to the ultimate user.

As further shown and preferred in FIG. 1, the cable head 13 also preferably includes an output network 8206. The output network receives the output from the master combiner and a synchronizer portion 8204, which is preferably a composite video signal and a separate color burst signal, the composite video signal preferably being a composite black and white type of video signal. Output network 8206 preferably includes a pre-equalization filter 8207 which preferably compensates for signal distortion in the pseudo video scan line composite video signal output of the master combiner and synchronizer 8204 as will be described in greater detail hereinafter with reference to FIGS. 10 and 12A through 12E. The output network 8206 also preferably includes a conventional video line driver 8208 which is connected to the output of a conventional summing network 8209 which sums the color burst signal with the distortion compensated composite video signal output of pre-equalization filter 8207 to preferably provide a composite color type of television signal; that is a pseudo video scan line which has the characteristics of a conventional color television scan line, in that it has color burst, with the exception that no color sub-carrier is provided in the composite color pseudo video scan line output portion 12a of network 8206. This digital data containing signal portion 12a of the TV field is preferably the same type of signal as illustrated in FIG. 2 of the aforementioned copending U.S. patent application Ser. No. 611,843, *now U.S. Pat. No. 4,042,958,* and which diagram is repeated herein as FIG. 14 for purposes of clarity. It should be noted that, as shown and preferred in FIG. 1, during the time that the normal TV picture information portion of the TV field is applied to the output data line 1902, the pre-equalization filter 8207 is disconnected from the output by a disable signal provided via disable line 8804 from master combiner synchronizer 8204, since such pre-equalization is not necessary for the normal TV picture information signal portion of the TV field.

As shown and preferred in FIG. 14, this pseudo video scan line 12a, as was previously described, is identical in format to a conventional television video scan line; field is inserted into this normal television channel so as to normally not be visible when the normal TV picture data is viewed on a conventional TV receiver, as will be described in greater detail hereinafter.

As will also be described in greater detail hereinafter, although the data rate of the preferred piggy back row grabbing system 10 of the present invention is reduced as compared to the data rate of a pure row grabbing system, such as described in the aforementioned U.S. Ser. No. 611,843, *now U.S. Pat. No. 4,042,958*, or U.S. Pat. No. 3,889,054, the present piggy back system 10 has the advantage that it operates on an existing normal television channel over which the user receives normal TV picture data and does not require a separate channel assignment dedicated to the row grabbing digital data. As will also be described in greater detail hereinafter, in carrying out the transmission of row grabbing digital data along with normal TV picture data on a conventional TV channel, a start bit is added to the conventional transmission at the beginning of each normal TV scan line as well as at the beginning of each digital data packet containing pseudo video scan line, which may occupy one or more of the TV scan line positions of the TV field, preferably located at the bottom of the TV field. Preferably both the start bits and the pseudo video scan lines themselves are inserted at locations which would normally place them outside of the normal TV mask area on a conventional TV receiver, such as the type normally used in the home.

Because of the aforementioned slower transmission rate of the preferred piggy back row grabbing system 10 of the present invention as compared to a pure row grabbing system, the use of two identical digital data transmission systems 1900a and 1900b, each comprising a computer 2000a and 2000b, respectively, having an associated mass memory 2010a and 2010b, respectively, to provide digital data information for transmission by transmitters 8202a and 8202b, respectively, is presently not preferred unless the increased reliability of such a dual system is desired. However, if desired, such a dual interleaved transmission system, could be utilized. In such an instance, as will be described in greater detail hereinafter, computers 2000a and 2000b and associated mass memories 2010a and 2010b, are preferably identical in function and operation to computer 2000 and associated mass memory 2010, as previously described in the aforementioned U.S. Ser. No. 611,843, *now U.S. Pat. No. 4,042,958*, with the exception that information provided from computer 2000a and 2000b is preferably identical in content but 180° out of phase in terms of time relationship to the provision of this information.

With respect to FIG. 1 of the present invention, this figure corresponds to an improvement on what is shown in FIG. 19 of the aforementioned U.S. Ser. No. 611,843, *now U.S. Pat. No. 4,042,958*, with identical reference numerals being used herein for substantially identically functioning components and with the same reference numerals followed by the letters a and b, respectively, if there is a plurality of such similarly functioning elements.

Referring to digital transmission system 1900a, the information output of computer 2000a is preferably provided to the preferred transmitter portion 8202a. If the system were to employ a dual interleaved transmission scheme instead of the presently preferred single digital data transmission scheme, then the information output of computer 2000b would preferably similarly be provided to preferred transmitter portion 8202b, which would be preferably identical in function and that is, it is consistent with FCC and EIA standards for a video scan line signal format; however, this pseudo video scan line 12a actually contains a row of information, such as approximately between 11 and 13 actual television video scan lines of information with the transmission time of the pseudo video scan line 12a being equal to the transmission time of a conventional TV video scan line comprised in the TV field, which is approximately 63 microseconds. Thus, it should be noted that although a single pseudo video scan line occupies only one television scan line position in the normal TV field in the preferred piggy back system 10 of the present invention, it actually contains displayable information for an entire row, such as 11 to 13 actual displayable television scan lines, on a row grabbing video display terminal, such as the type described in U.S. Pat. No. 3,889,054. With respect to the pseudo video scan line 12a portion of the TV field piggy back transmission, the horizontal sync and vertical sync portions are preferably identical with a conventional video signal as is the format for the horizontal sync amplitude. The time and amplitude envelope of the video region of the pseudo video scan line 12a portion of the TV field piggy back transmission, which region is defined as areas H, J, B, C, D, E and K in FIG. 14, is identical with the format for a conventional video scan line as is the three dimensional frequency envelope. Thus, all of the above mentioned standard conditions for a conventional video scan line signal are met by the pseudo video scan line 12a portion of the TV field piggy back transmission provided at the output of network 8206. Accordingly, any equipment that can handle conventional video can handle the pseudo video scan line output 12a signal portion of the TV field piggy back transmission which can thus be transmitted and received through a conventional television distributed system with conventional television equipment over a common normal TV channel along with normal TV picture data information.

Figure 5:
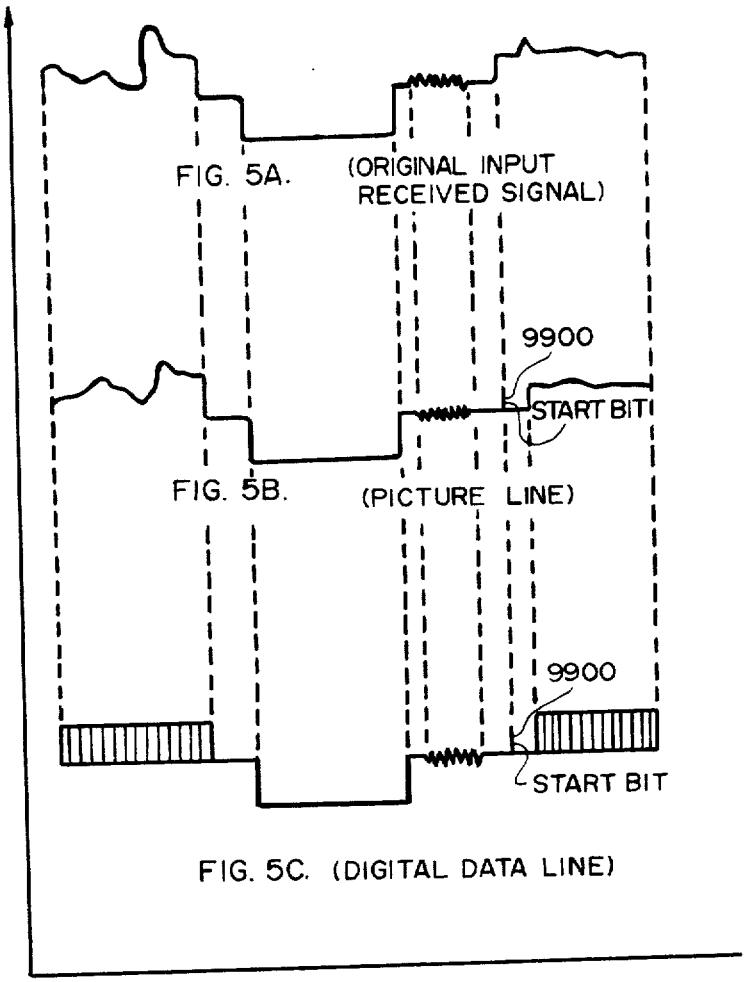
FIGS. 5A through 5C comprise a timing diagram of graphic illustrations of typical waveforms of the received signal during both reception of a picture line and of a data line.
Figure 14:
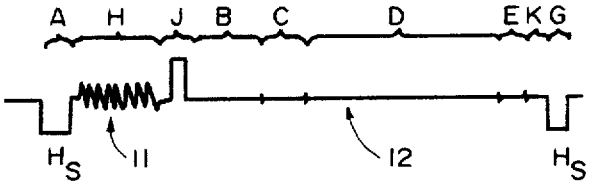
FIG. 14 is a diagrammatic illustration of the preferred digital data containing pseudo video scan line portion of the piggy back signal provided by the cable head portion of the system of FIG. 1.

Returning once again to the pseudo video scan line 12a illustrated in FIG. 14, as is also true for the pseudo video scan line of the type previously described in U.S. Pat. No. 3,889,054, this signal is [inreality] *in reality* a digital signal which looks like a conventional video scan line to the row grabbing receiver 28a or 28b. Both the pseudo video scan line 12a portion, and the normal TV picture data scan line portion of the TV field piggy back transmission, as will be described in greater detail hereinafter, however, preferably employ a start bit to provide timing and phase adjustment for the phase locked loop of the row grabbing receiver terminal 28a or 28b as described in the aforementioned copending patent application U.S. Ser. No. 611,843, *now U.S. Pat. No. 4,042,958*. The position of this start bit in the normal TV picture data portion is illustrated in FIG. 5B while the position of this start bit in the pseudo video scan line 12a or digital data line is illustrated in FIG. 5C and shown in greater detail in FIG. 14. In such an instance, that is with respect to the position of the start bit in pseudo [videoscan] *video scan* line 12a, region F which was previously contained in the pseudo video scan line transmitted in the system of U.S. Pat. No. 3,889,054, and which contained the clock synchronizing burst or pulse train at the bit rate (the frequency preferably being equal to one-half the bit rate) and comprised a pulse train of ones and zeros for two character or 14 bits [it] *is* not present and the sync burst information which [are] *was* previously contained therein is not required for timing and phase adjustment. Instead, region H, which preferably contains color burst information and region J which preferably contains one start bit, are preferably inserted between regions A and B, with regions B, C, D and E being electronically shifted down in position to be adjacent region G, only being separated therefrom by a region K, which region K merely represents the standard TV spacing for providing the front porch of the signal, the back porch of the signal being defined between region A and the leading edge of the start bit in region J. The color burst signal in region H preferably is the standard FCC eight cycle signal at 3.58 megahertz. Apart from the repositioning and [delection] *deletion* of certain regions of the pseudo video scan line, the contents of regions A, B, C, D, E and G in pseudo video scan line 12 of FIG. 14 are preferably identical with that previously described with reference to FIG. 1 of U.S. Pat. No. 3,889,054 with respect to the transmission of a displayable row of data. Suffice it to say for purposes of clarity, that region A represents the horizontal sync signal which indicates the beginning of the pseudo video scan line from the beginning of the horizontal sweep for a conventional television scan line; and region B represents the pseudo video scan line 12a address which contains all the following information bit locations, as one preferably indicating the presence of a pulse and a zero preferably indicating the absence of a pulse, all of the following information bits preferably being present when data is transmitted: group, which is the section or chapter including a predetermined number, such as 1,000, of pages and is the most significant bit of the page address; page, which represent one frame in a group, and row which occupies one character space which is preferably 7 bits and defines a portion of the page preferably containing approximately 11 to 13 scan lines which comprise one displayable character. The region B also preferably contains direct address information, which is the first transmitted bit preferably and is a zero unless a direct address condition exists which is control conditions for a selected row grabbing terminal informing the terminal to supercede the requested page. This region B also preferably contains permission information which is a one bit position which is preferably a one only when the user is being given authority to receive one or more selected groups of information. It should be noted that preferably there is also an emergency override condition which provides control information to all row grabbing terminals to override all requests including the permission request and preferably occurs on a page and group information bit location of zero, this condition preferably being utilized to display emergency information such as a civil defense warning. Region C is preferably a special character information region of 7 bits which is preferably utilized for optional functions to be performed by the individual row grabbing receiver 28a or 28b or terminal. Region D preferably contains 32 characters of displayable information in digital form. Region E preferably contains error check information, as will be described in greater detail hereinafter. Region G is preferably the same as region A and represents the horizontal sync signal. As was previously mentioned, the vertical sync is preferably provided by generating a special sequence of horizontal sync pulses during the normal television blanking period, which is after approximately 236 horizontal sync pulses associated with the pseudo video scan line portions of the TV field piggy back transmission which, as in U.S. Pat. No. 3,889,054, may preferably be after approximately 15 pages of row grabbing data have been transmitted. Therefore, 15 pages are transmitted before each vertical sync. The sync signal looks like a conventional composite sync signal with a vertical sync interval comprising approximately nine normal horizontal sync pulse times.

The aforementioned piggy back transmission comprising the composite pseudo video scan line signal portion output of network 8206 as well as the conventional composite video signal output portion of network 8206 with filter 8207 disabled, is preferably provided over a common channel to a conventional CATV RF modulator 24, such as the type of modulator described in the aforementioned copending U.S. patent application, *now U.S. Pat. No. 4,042,958* one such modulator 24 being preferably provided for each television channel on which piggy back information is to be transmitted, only one such channel being illustrated in FIG. 1 by way of example. Modulator 24, by way of example, preferably provides this information to a conventional CATV cable system 22 such as described in the aforementioned copending, *now U.S. Pat. No. 4,042,958* U.S. patent application with, however, the addition of a conventional television receiver 1920a, 1920b, such a conventional color TV receiver being connected to the common cable channel along with the row grabbing terminal 28a to 28b. The television receiver 1920a, 1920b could have its own video display 1922a, 1922b or could selectively employ a common video display 1924a, 1924b with the row grabbing terminal 28a, 28b. Preferably, the TV receiver 1920a, 1920b operates conventionally to display the normal TV picture data with no visible evidence of the digital data piggy back transmission. Similarly, row grabbing terminal 28a,28b essentially operates [conventional] *conventionally*, such as described in U.S. Pat. No. 3,889,954, with the exception of additional conventional gating circuitry (not shown), including a conventional line counter to identify the TV scan line or lines, such as TV scan line number 239, position containing the pseudo video scan line or lines portion of the piggy back transmission TV field. During the occurrence of this TV scan line or lines in a given piggy back transmission TV field, the [gatin] *gating* circuit passes the pseudo video scan line or lines to the row grabbing terminal 28a, 28b for processing in the normal manner described in U.S. Pat. No. 3,889,054. At all other TV scan lines of the piggy back transmission, the gating circuit passes the start bit portion of the TV scan line signal to the row grabbing terminal 28a, 28b, for use by the phase locked loop thereof in maintaining phase lock in the manner described in U.S. Pat. No. [3,889.054]*3,889,054*, while gating out the normal TV picture video data portion of the TV scan line. It should be noted that the row grabbing terminal 28a or 28b preferably conventionally processes and combines a plurality of such pseudo video scan lines from a plurality of such piggy back transmission TV fields for providing a continuous video display of a selectable predetermined frame or page of information which frame may be updated on a displayable video row-by-row basis dependent on the real time data information content of the received pseudo video scan line in the manner described in either U.S. Pat. No. 3,889,954 or U.S. Ser. No. 611,843, *now U.S. Pat. No. 4,042,958,* the contents of both of which are specifically incorporated by reference herein in their entirety.

Referring now to the type of video information provided to the system of FIG. 1 for forming the pseudo video scan line portion of the piggy back transmission, this information is provided from external information sources, two such sources 2002 and 2004, being shown by way of example. The provision of this external information, as is the operation of computer 2000a and computer 2000b and associated mass memories 2010a and 2010b, is preferably identical with that described in the aforementioned copending U.S. patent application Ser. No. 611,843, *now U.S. Pat. No. 4,042,958,* or in U.S. Pat. No. 3,889.054, with the exceptions thereto to the described in greater detail hereinafter. Thus, the associated mass memory 2010a and/or 2010b is preferably read in conventional fashion by the associated computer 2000a and/or 2000b to provide the requisite information via the associated transmitter portion 8202a and/or 8202b to the master combiner and synchronizer 8204. This information may be interleaved as previously generally described, with the associated mass memories 2010a and 2010b each preferably having sufficient storage capacity to store the entire page capacity of the system 10 or, as presently preferred, be solely provided from a single computer 2000a or 2000b. As will be described in greater detail hereinafter, the computer 2000a or 2000b may preferably be, by way of example, either a PDP-8E or PDP-11 manufactured by Digital Equipment Corporation, with the respective associated mass memory 2010a or 2010b being that which is normally utilized with such computer 2000a or 2000b, respectively. If the aforementioned dual interleaved system is employed, the computers need not both be the same such as, by way of example, utilizing a PDP-8E for computer 2000a and a PDP-11 for computer 2000b.

Now referring to the provision of the normal TV picture video data to the piggy back row grabbing system of FIG. 1, the system preferably includes a conventional TV monitor 1930 which receives a conventional normal TV signal via a conventional cable or antenna 1932. The composite video output of monitor 1930 is then provided to a conventional sync separator 1934 which conventionally separates the picture components and the sync components from the composite video input. These separated components are then provided via paths 1936 and 1938, respectively, to the master combiner synchronizer 8204 which, a previously mentioned, connects this normal TV picture video directly to output data line 102, while disabling filter 8207, except during the TV scan line or lines (position or positions) of the TV field containing the pseudo video scan line.

It should be noted that as used throughout the specification and claims, the terms "page" means one video frame of information, the term "group" means a predetermined number of pages, the term "row" is a displayable video row and means a portion of a page containing a plurality of conventional television video scan lines, and the term "pseudo video scan line" means a signal which is identical in form to that of a conventional video scan line but which actually contains a row of information, such as approximately between 11 to 13 actual television video scan lines of information with the transmission time of the pseudo video scan line preferably being equal to the transmission time of a conventional TV video scan line, which is approximately 63 microseconds, and with the pseudo video scan line being an entire self-contained packet of information necessary for video display of that row. The term conventional or television video scan line or TV scan line is used in its conventional manner.

Typical Transmitter Portion - General Description

Figure 6:
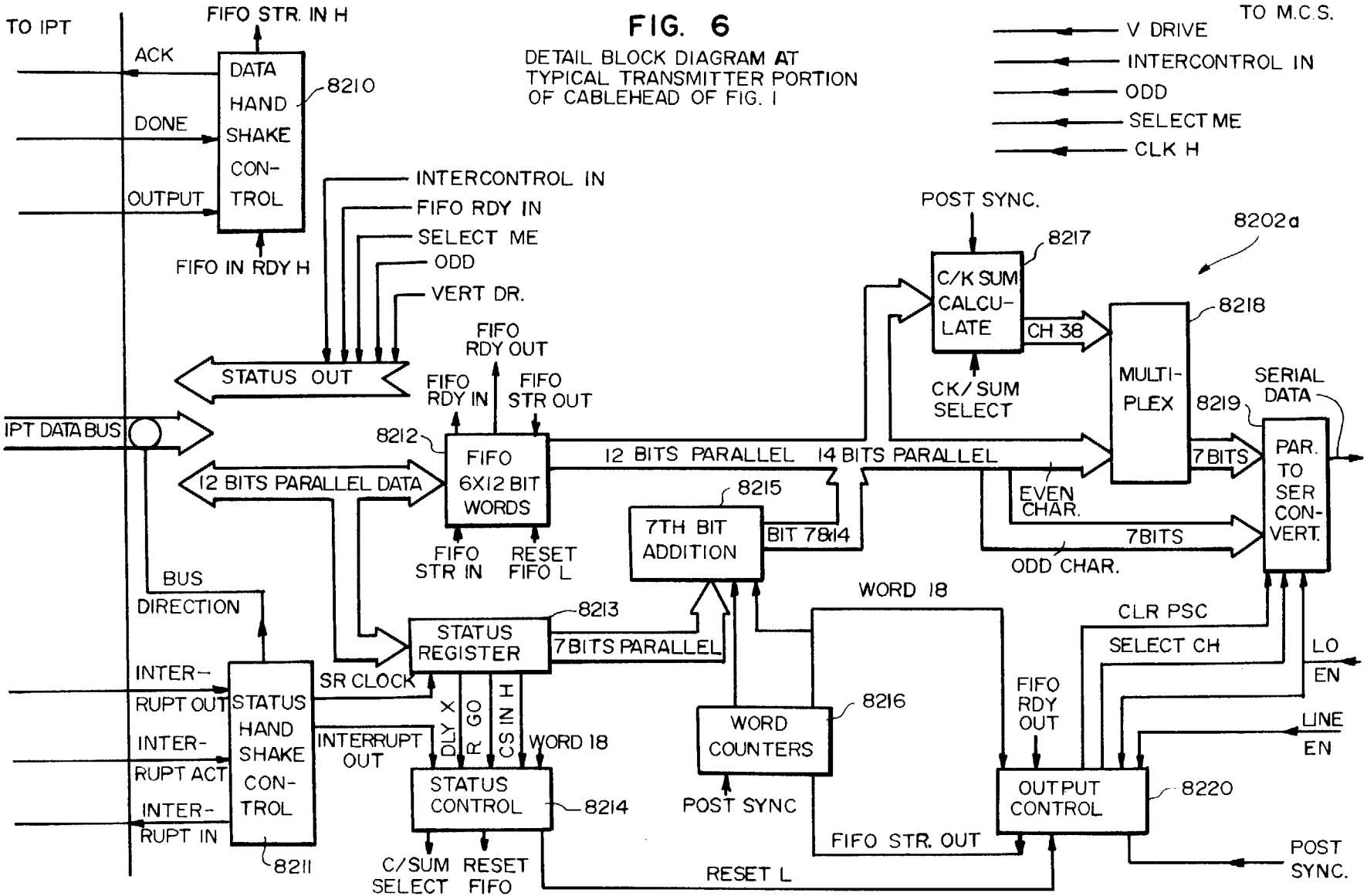
FIG. 6 is a more detailed block diagram of a typical transmitter means portion of the system of FIG. 1.

Referring now to FIG. 6, FIG. 6 is a detailed block diagram of a typical transmitter portion, such as transmitter portion 8202a, of the preferred cable head 13 shown in FIG. 1. As previously alluded to, in providing the pseudo video scan line portion of the piggy back transmission field, there are preferably two types of transfers that can take place between the computer 2000a or 2000b and the cable head 13, a status transfer and a data transfer. The status transfer is preferably bidirectional, that is the computer 2000a or 2000b can send status to the cable head 13 and receive status from the cable had 13. A status transfer to the cable head 13 preferably consists of a single word transfer as does a status transfer from the cable head 13. Such a status word is preferably returned from the cable head 13 after every status word received by the cable head 13. The second type of aforementioned transfer that can preferably take place is the unidirectional transfer of data from the computer 2000a or 2000b to the cable head 13. This is accomplished through the data break, that is the direct memory access facility of the computer 2000a or 2000b. Such data transfers must preferably consist of an internal number of data packets per transfer, with each such data packet preferably consisting of 20 words, and each word preferably comprising 12 bits. The principal video data characters for the row grabbing portion of the system are preferably transmitted in six bit sequences. Thus, data is preferably transferred from the computer 2000a or 2000b in a direct memory access transfer. The aformentioned status word transfer from the computer 2000a or 2000b is preferably utilized to insert a seventh bit of data for each transmitted video character. This seventh bit of data is preferably utilized, principally, for special applications of the row grabbing portion of the preferred system of the present invention. An example of such use would be when it is desired to display graphic symbols as well as characters. The status transfer for generation of the seventh bit is preferably used only when the computer 2000a or 2000b is a 12 bit machine such as is the case with the PDP-8E. The PDP-11 is a 16 machine and when it is used the seventh bit is included as part of the direct memory access transfer word. The status word transfer from the cable head 13 to the computer 2000a or 2000b is preferably used to provide the computer 2000a or 2000b with information pertaining to the mode of operation of the cable head 13 with respect to the provison of pseudo video scan lines. Examples of this kind of information are start of vertical field, odd or even line transmission if the dual interleaved transmission system for the pseudo video scan lines is utilized, or operator control settings.

Referring to FIG. 6, which is a detailed block diagram of typical transmitter portion 8202a, the typical transmitter portion 8202a includes control circuits 8210 which are involved with the direct memory access data transfer. The output line from the computer 2000a or 2000b is asserted whenever data is available. These control circuits 8210 preferably respond thereto by asserting the "acknowledgment" line. When a complete transfer of data has been completed, the computer 2000a or 2000b asserts the "done" line. Portion 8202a also includes control circuits 8211 which control the operation of data transfer during a status word transfer. This is accomplished via the various interrupt lines to the computer 2000a or 2000b. These will be described in greater detail hereinafter. During data transfer the 12 bit data words from the computer 2000a or 2000b are applied to a conventional first in-first out buffer 8212. This buffer 8212 permits words to be stored and then shifted out asynchronously. Buffer 8212 applies the output data words to an output multiplexer 8218 and to a check sum circuit 8217. Depending on the setting of the status word, a status register 8213 may apply a seventh bit to the data stream via a seventh bit addition circuit 8215. During the transmission of a pseudo video scan line, check sum circuit 8217 continuously adds digitally the value of one 7 bit word to the sum of the previous words of that same line. This operation preferably continues through 37 video characters. During the 38th and preferably final character of the pseudo video scan line the sum is deposited as the 38th character. Multiplexer 8218 preferably selects the data words for the check sum depending on the associated character numbers. As shown and preferred in FIG. 6, a parrell-to-serial converter 8219 converts the 7 bit data words to a serial data line. This line is fed to the master combiner synchronizer 8201. Other control circuits and counters illustrated in FIG. 6 are used to control the operation and timing of the aforementioned ciruits as well as of a status control circuit 8214, work counters 8216 and an output control circuit 8220, all of which will be discussed in greater detail hereinafter. A more detailed description of the function and operation of the various circuits illustrated by the functional blocks 8210, 8211, 8212, 8213, 8214, 8215, 8216, 8217, 8218, 8219 and 8220 in FIG. 6 which comprise the typical preferred transmitter portion 8202a of the preferred cable head 13 will be described in greater hereinafter with reference to FIGS. 8 and 9.

Master Combiner Synchronizer Portion-General Description

Referring now to FIG. 2, FIG. 2 is a detailed block diagram of the preferred embodiment of the master combiner synchronizer portion 8204 of the preferred cable head 13 illustrated in FIG. 1. As shown and preferred in FIG. 2, portion 8204 includes a conventional oscillator 8240, which is the single source of all timing signals within the cable head 13. This oscillator 8240 is preferably a crystal controlled 143.1818 megahertz oscillator. The output of this oscillator 8240 is preferably applied to two conventional frequency dividers 8241 and 8242. Divider 8241 preferably divided the oscillator frequency by a factor of 28 to preferably provide a 5.113 megahertz signal which is the clock for the data. This clock preferably establishes the timing of the data bits in the pseudo video TV scan line portion of the piggy back transmission. The other frequency divider 8242 preferably divides the oscillator frequency by a factor of 10 to provide a 14.318 megahertz signal to a conventinal TV sync generator 8243. This sync generator 8243 preferably includes additional conventional frequency dividers and gating circuits as necessary for generating conventional televison synchronizing signals and color reference signals. A television color burst signal is generated on line 8250 at the output of gate 8256. This gate 8256 preferably receives a continuous color burst subcarrier and a color flag from the sync generator 8243. The color flag is preferably used to gate the color subcarrier to generate the color burst provided via path 8250. Master combiner synchronizer portion 8204 also preferably includes timing control circuit 8244 which utilizes the composite blanking color flag, and 5.113 megahertz clock to generate character timing signals. One of these signals, the load enable signal is provided via path 8252 to either the transmitter 8202d or 8202b or both, if it is an interleaved transmission system, to establish the time for loading data words into the parallel-to-serial converter 8219. In addition, timing control circuit 8244 generates post-sync and frame enable signals which are preferably utilized by a line select circuit 8254 which is subsequently preferably utilized by a data select circuit 8246 to select DATA A from transmitter 8202a or DATA B from transmitter 8202b if the system providing the pseudo video scan line position of the piggy back transmission is an interleaved transmission system. DATA A and DATA B, as previously mentioned, being identical in content but 180 degrees out of phase in timing relationship, or to a picture select circuit 1950, which normally selects the picture video from the sync separator 1934 via path 1936. Timing control circuit 8244 also preferably generates the start bit which is preferably as described in the aforementioned copending U.S. patent application, *now U.S. Pat. No. 4,042,958*. The selected data, either normal TV picture data or computer provided pseudo video scan line digital data, with the inserted start bit, is provided via path 8255 to a sync insertion circuit 8248 to provide the composite video signal output via path 8253. It should be noted that preferably the start bit and sync components of the composite video scan line output signal are inserted by start bit insertion circuit 8247 and sync insertion circuit 8248, respectively, in the same manner regardless of whether the [Tv] *TV* scan line portion of the piggy back transmission TV field being transmitted comprises the normal TV picture data or is a pseudo video scan line comprising digital data. The sync pulses which are provided to the sync insertion circuit 8248 are supplied by the TV sync generator 8243 and preferably provide all of the conventional standard vertical and horizontal synchronizing pulses that are normally present on a standard TV signal. Detailed function and circuit arrangements for accomplishing the functions of the aforementioned portions 8240, 8241, 8242, 8243, 8244, 8245, 8246, 8247, 8248 and 8256, which provide the various signals present on paths 8249, 8250, 8251, 8252, 8253, 8254 and 8255 shall be described in greater detail hereinafter with reference to FIGS. 3 and 4 which are detailed schematic diagrams of the preferred embodiment of the master combiner synchronizer 8204 portion of the preferred cable head 13 of the present invention shown in FIG. 1. Suffice it to say at this time, that in addition to the above, it should be noted that the composite sync component of the received normal TV signal provided via path 1938 from sync separator 1934 is provided to a conventional phase locked looop 1956 which circuit 1056 also receives the compsite sync output of local TV sync generator 8243 via path 1958. If these two sync input waveforms to circuit 1956 are not coincident both vertically and horizontally, the phase loop 1956 changes the control voltage to oscillator 8240, provided via path 1960, to adjust the frequency thereof to bring these two sync waveforms into exact coincidence. Phase locking of the master oscillator 8240 in this manner is required in order that the output picture information by synchronized with data in the piggy back transmission. Furthermore, as will be explained in greater detail hereinafter with reference to FIG. 3, the timing control circuit 8244 provides the frame enable signal to line selct circuit 8245 for only one or few TV scan lines dependent on the number of pseudo video scan lines in the piggy back transmission TV field, the lack of assertion of the frame enable signal being the filter disable signal provided via path 1962 to disable filter 8207 only when normal TV picture data is transmitted. During the TV scan line or lines during which the pseudo video scan line or lines, that is the digital data [now] *row* grabbing information, is to be transmitted, picture select circuit 1950 selects the output from the transmitter 8202a, if only one computer and transmitter are utilized as present preferred, or from data select circuit 8246 if the aforementioned interleaved transmission is utilized.

Master Commbiner Synchronizer Portion - Detailed Description

Figure 3:
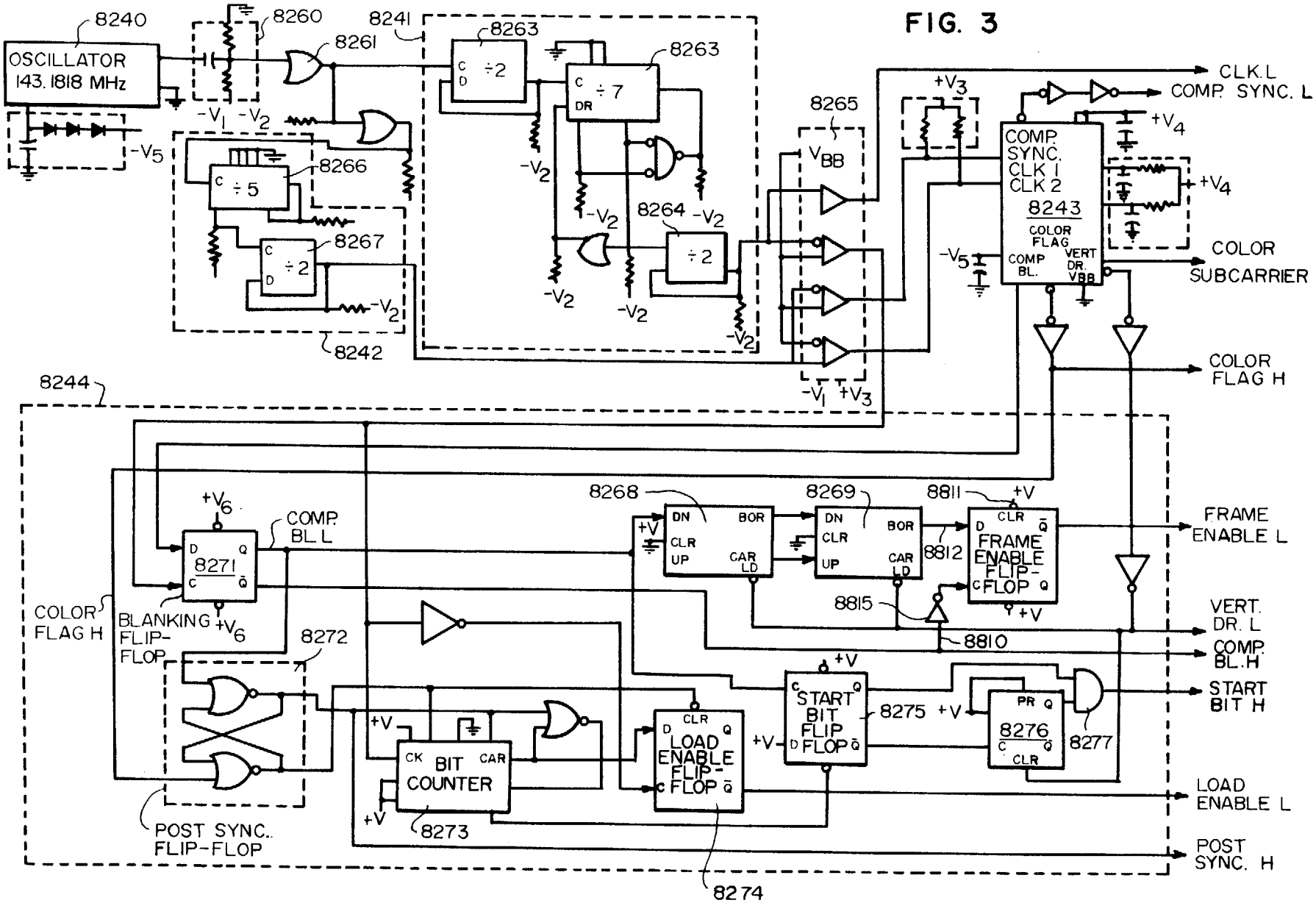
FIGS. 3 and 4 taken together comprise a logic schematic diagram of the master combiner synchronizer portion of FIG. 2.
Figure 4:
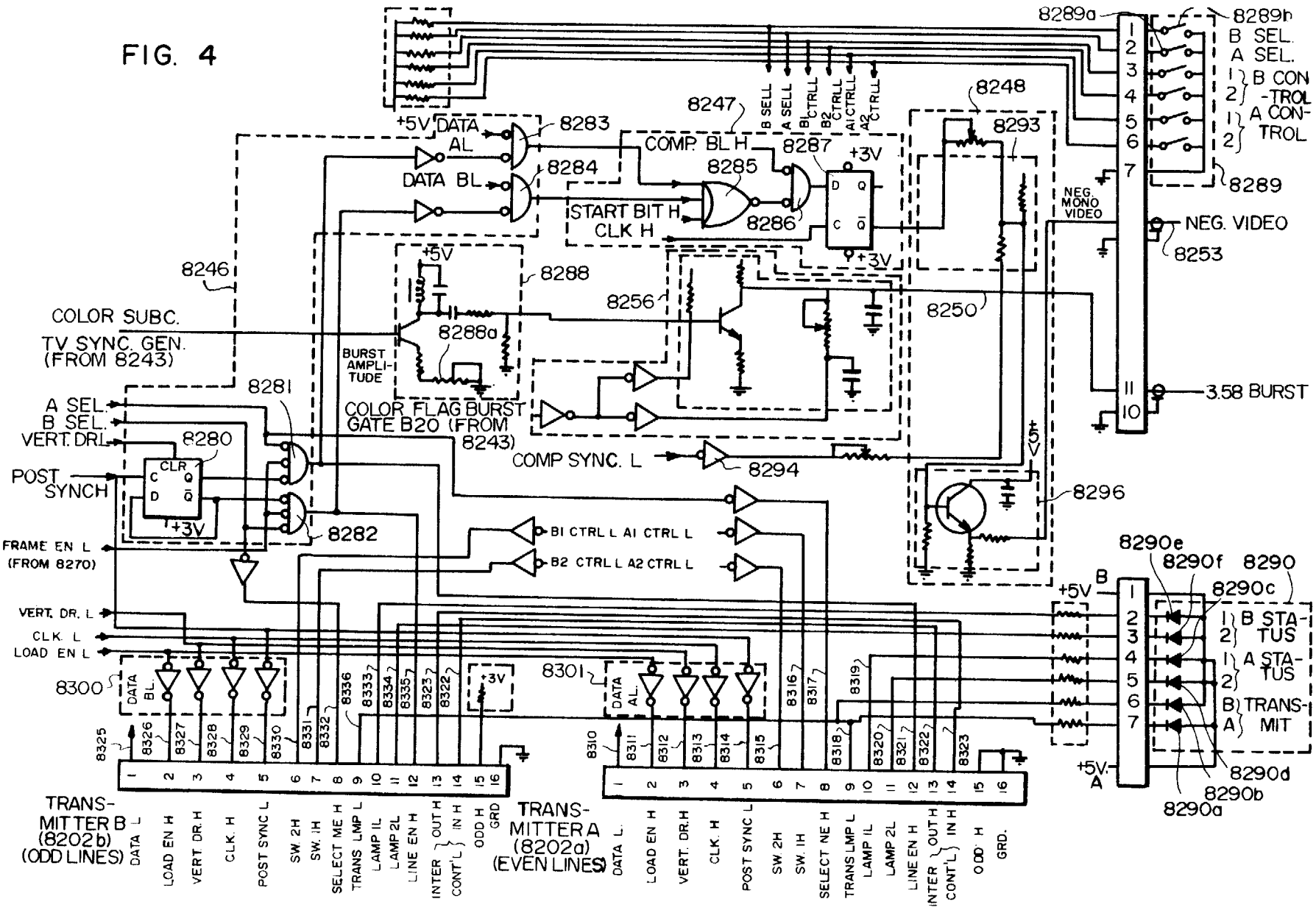
Figure 11:
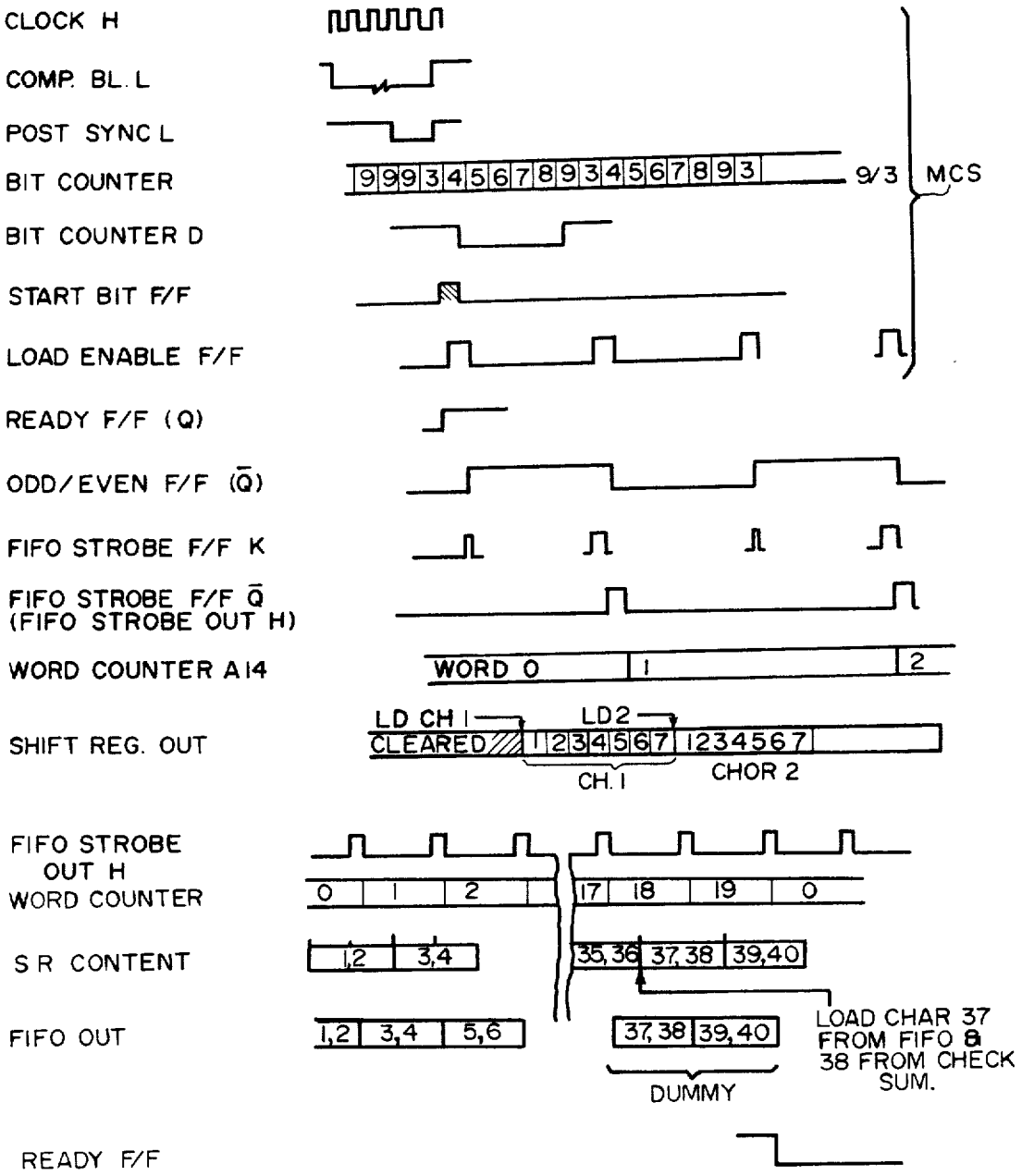
FIG. 11 is an illustrative timing diagram of the various waveforms present in the cable head portion of the system of FIG. 1 except for the waveforms of FIGS. 5A through 5C.

Referring now to FIGS. 3 and 4, which taken together comprise a detailed schematic diagram, partially in logic block, of the preferred embodiment of the master combiner synchronizer portion 8204 of the preferred cable head 13 of the present invention, this portion 8204 shall now be described in greater detail. As previously described with reference to FIG. 2, 8240 is the master synchronizing oscillator which preferably operates at 143.1818 megahertz, and which is preferably a conventional crystal oscillator. The output of the oscillator 8240 is preferably coupled via a level shifting network 8260 to a buffer gat 8261. The buffered output of the oscillator 8240 is provided to a flip-flop 8263 which preferably divides the frequency by two and provides this frequency divided to a counter 8750. This counter 8750 with its associated feedback network preferably provides a division by 7. The outputof counter 8750 is preferably provided to another divide-by-2flip-flop 8264. Thus, the total division of the oscillator 8240 output amounts to a divide-by-28, and, accordingly, the output frequency of flip-flop 8264 is 1/28 of the 143.1818 magahertz oscillator frequency. This establishes the forementioned 5.113 megahertz signal which is preferably provided as the system data clock. The 143.1818 megahertz signal at the output of buffer 8261 is also preferably fed via another buffer 8262 to a divide-by-5 counter 8266. The output of counter 8266 is preferably connected to a divide-by-2 flip-flop 8267 to provide at its output a frequency of 14.31818 megahertz which is 1/10 of the oscillator 8240 frequency and is the preferred clock frequency for the TV sync generator 8243, counter 8266 and flip-flop 8261 comprising divide-by-10 network 8240. Preferably all of the aforementioned circuits comprising networks 8241 and 8242 as well as lever shifter 8260 and buffers 8261 and 8262, are MECL integrated circuits of the Motorola 10,000 series, by way of example, although other equivalent functioning logic could be utilized. Thus, a buffer and level shifter 8265 which serves to convert the MECL levels of the aforementioned logic to standard TTL levels which are preferably required by the subsequent logic circuitry comprising the preferred master combiner synchronizer portion 8204, is provided, since such subsequent logic is preferably either TTL or TTl compatible logic although, if desired, other equivalent functioning logic could be utilized in place thereof. The level shifter 8265 preferably provides the 14.31818 megahertz clock to sync generator 8243 at two opposite phases of the sync generator 8243, labeled CLK 1 and CLK 2, respectively, in FIG. 3. The sync generator 8243 is preferably a conventional integrated circuit sync generator such as a Fairchild Model No. 3262. The composite blanking signal from sync generator 8243 as well as the data clock signal from level shifter 8265 are both preferably provided to a D type flip-flop 8271. The output of flip-flop 8271 is preferably a resynchronized composite blanking signal which is delayed by one clock period frome the input blanking signal. This delayed composite blanking signal as well as the color flag from sync generator 8243 are preferably provided to two inputs of a set/reset flip-flop 8272 to generate the post-sync waveform, such as the waveform illustrated in FIG. 11, by way of example. This post-sync waveform, as illustrated in FIG. 11, establishes a period of time near the end of the horizontal blanking interval and immediately [precediang] *preceding* the start bit of pseudo video TV scan line of the piggy back transmission TV field. A bit counter 8273 is preferably utilized to establish the start time for each character, that is the beginning of each 7 bit sequence. During the post-sync waveform the bit counter 8273 is preferably continuously preloaded to a count of 9 by the data clock. At this time the carry out line of the counter 8273 is preferably high. As soon as the post-sync signal is removed, the counter 8273 is prefereaby reloaded to a count of 3 and then is allowed to count until the carry out is again asserted at count 9, this cycle continuing with the counter 8273 being reloaded to 3, counting to 9 and being reloaded. This preferably continues for the duration of any pseudo video TV scan line comprising the digital data portion of the piggy back transmission TV field. The aforementioned carry out line of the bit counter 8273 is preferably provided to the D input of D type flip-flop 8274. This flip-flop 8274 is preferably clocked by the data clock and, thus, has an output which is preferably asserted for 1 bit time and delayed by a ½ clock bit time from the carry out of the counter 8273. The output of 8274 is the aforementioned load enable pulse whose waveform is illustrated by way of example in FIG. 11. Bit counter 8273 also preferably controls another flip-flop 8275 which flip-flop 8275 preferably generates the start bit, the D output of counter 8273 preferably being provided to the clear input of flip-flop 8275. Flip-flop 8375 is preferably initially clocked to a set state by the trailing edge transition of the [composte] *composite* blanking signal from flip-flop 8271. This transition establishes the beginning of the start *bit* for each scan line in the piggy back transmission TV field. Preferably, one bit time [labor] *later* bit counter 8273 transfers from a count of 9 to a count of 3. At that time its D output preferably goes from the high to low thereby clearing flip-flop 8275 and terminating the start bit. Another flip-flop 8276 and a gate 8277 are preferably provided in order to remove the first start bit that occurs during any vertical frame as the first horizontal line in the TV frame can be a half line and it is preferably not desired to have a start bit on such a half line. Flip-flop 8276 is initially cleared by the vertical drive pulse and, in its cleared state, presents a low level to gate 8277. Thus the start pulse at the output of flip-flop 8275 cannot be passed through gate 8277 while flip-flop 8276 is cleared. After the completion of the first start bit flip-flop 8276 is set and subsequent start bits are allowed to pass through gate 8277. Counters 8268 and 8269 and another flip-flop 8270 are also provided and are preferably utilized to estabish the frame enable period. The counters 8268 and 8269 are preferably initially loaded to a composite value of 239. Clock pulses [whih] *which* are provided subsequent to the removal of the vertical drive pulse preferably cause the counters 8268 and 8269 to decrement. As shown and preferred in FIG. 3, the frame enable line 8804 is asserted for only one TV scan line, the duration of the pseudo video scan line portion of the piggy back transmission TV field [whih] *which* scan line is preferably, by way of example, TV scan line number 239. In order to accomplish this, the D input to flip-flop 8270 is connected from the borrow output of counter 8269 and the clock input to flip-flop 8270 is provided by the composite blanking line output from flip-flop 8271 through inverter 8815 via path 8810. If desired, by different connection which would be obvious to one of ordinary skill in the art, the frame enable line 8804 could be asserted for a plurality of TV scan lines, if more than one pseudo video scan line was to be contained in the piggy back transmission TV field, rather than only at the end of the TV frame interval as presently preferred. The advantages of using only one line at the very bottom of the TV frame is that this increases the likelihood that that line will never appear on a conventionally correctly adjusted conventional TV receiver 1920a, 1920b. Of course, with the presence of more digital data or pseudo video scan lines in the piggy back transmission TV field, the data rate is increased but the likelihood of a line being visible on such TV receiver 1920a, 1920b becomes greater. All of the aforementioned circuits 8268, 8269, 8270, 8271, 8272, 8273, 8274, 8275, 8276 and 8277 preferably comprise timing control circuit 8244.

Referring now to FIG. 4, the balance of the circuitry associated with the preferred embodiment of the master combiner and synchronizer 8204 shall now be described. As shown and preferred in FIG. 4, a plurality of switches 8289 are provided to allow the operator to establish the operating mode of the cable head 13. If a dual interleaved pseudo video scan line transmission is employed, then the switch set 8289 will preferably include A and B select switches 8289b, respectively, which allow the operator to turn on or off either of the data channels associated with computer 2000a and 2000b, respectively. In such an instance, the control levels from these switches 8289a and 8289b are provided to gates 8281 and 8282. Also provided to these gates 8281 and 8282 is the frame enable signal output provided from flip-flop 8270 (FIG. 3). A third input to these input gates 8281 and 8282 is provided from another flip-flop 8280. This flip-flop 8280 is toggled by the post-sync waveform with opposite signal levels being provided to each of the gates 8281 and 8282 in such a way that alternately one output is enabled and then the other output is enabled in synchronism with the frame enable signal provided to the gates 8281 and 8282. Thus, in the instance of a dual interleaved transmission system each output is enabled only if its corresponding A (8289a) or B (8289b) select switch is on. The outputs of gates 8281 an 8282 preferably comprise control signals which are provided to the two transmitters 8202a and 8202b of such a dual interleaved transmission system, as illustrated in FIG. 1. In such an instance, these output control signals are utilized to authorize each transmitter portion 8202a and 8282b to process a pseudo TV [can] *scan* line.

The color subcarrier from sync generator 8243 is provided to a conventional transistor amplifier circuit 8288. This amplifier 8288 is preferably tuned to the 3.58 megahertz frequency of the color subcarrier and preferably has an adjustable resistor 8288a in its emitter circuit to permit adjustment of the color burst output amplitude of the amplifier 8288. The output of the amplifier 8288 is preferably provided along with the color burst flag from the sync generator 8243 to the color burst gate 8256. This gating circuit 8256 preferably consists of a conventional transistor amplifier so connected that the amplifier can be turned off by the color burst flag. Thus its output consists of a burst of the color subcarrier which occurs during the time established by the color burst flag. This output, which is provided on path 8280, is preferably provided at a low impedance to the output network 8206 as shown and preferred in FIG. 1. The other switches of the switch bank 8289, specifically, the A and B control switches 8289a and 8289b, respectively, are used to provide enabling levels to the transmitter portions 8202a and 8202b, if the aforementioned dual interleaved transmission system is utilized, as will be described in greater detail hereinafter. Preferably, a plurality of light-emitting diodes 8290 are also provided to provide indicator signals. A and B transmit indicators 8290a and 8290b, respectively, are lit when the corresponding transmitter portions 8202a or 8202b, respectively, is transmitting data if such an interleaved transmission is utilized. Similarly, in such an instance, A and B status indicators 8290c and 8290d for A status, and 8290e and 8290f for B status, respectively, are lit in accordance with data bits from the status register in the corresponding transmitter portions 8202a and 8202b, respectively. The derivation of the respective driving signals will be described in greater detail hereinafter.

As shown and preferred in FIG. 4, output inverters 8300 and 8301 provide buffering and inversion of the various signals provided from the portion of the master combiner synchronizer 8204 shown and described in FIG. 3, with the output of inverters 8300 and 8301 being provided to transmitters 8202b and 8202a, respectively, of the aforementioned interleaved system. As used throughout the specification and drawings, the letters L or H following a waveform description refer to positive or negative logic definitions of the signal; that is, by way of example, post-sync L refers to a waveform which is at its low level during the period of post-sync, whereas post-sync H would be the high level or inversion of this signal. This is true for all of the exemplary signals defined and shown in the drawings relating to the preferred embodiment of the present invention. As shown and preferred in FIGS. 4 and 9, the various signals which are provided to and from the transmitter portions 8202a and 8202b and the master combiner synchronizer 8204 are as follows, with FIGS. 5A through 5C showing various typical waveforms of the received signal during both reception of a normal TV picture line of the piggy back transmission TV field and of a digital data or pseudo video scan line thereof. With respect to the present preferred single transmitter portion 8202a, the respective signals which are provided between transmitter portion 8202a and master combiner synchronizer 8204 are the data L signal which is indicated as the data A L input to the master combiner synchronizer 8204 via path 8310, and the following signals provided via paths 8311 through 8317 from the master combiner synchronizer 8204, respectively labeled load enable H, vertical drive H, phase lock H, post-sync L, switch 2 H, switch 1 H, and select me H. The various status indicator lamps 8290a, 8290c and 8290d associated with transmitter 8202a, are preferably controlled via signals provided via paths 8318, 8319, 8320. If the pseudo video scan line transmission system comprises the aforementioned interleaved system, then an EVEN line enable signal is provided via path 8321 as an output signal which is the line enable H signal output of data select 8246 which is provided from gate 8324 of data select 8246. If, however, the presently preferred single transmitter system is employed, this EVEN signal as well as data select 8246 is omitted. Intercontrol signals output H and input H are provided via paths 8322 and 8323, respectively, between the transmitter portions 8202a and 8202b of the aforementioned interleaved transmission system. With respect to transmitter portion 8202, if such an interleaved system is employed as shown and preferred in FIGS. 4 and 9, the respective signals provided between transmitter portion 8202b and the master combiner synchronizer 8204 are, respectively, the data L signal which is the data B 1 signal to the master combiner synchronizer 8204 provided via path 8325, and respective output signals load enable H, vertical drive H, clock H, post-sync L, switch 2 H, switch 1 H and select me H provided paths 8326 through 8332, respectively, with the signals on paths 8317 and 8332 being the transmitter 8202a and 8202b select signals, respectively, and with the control signal for the status lights 8290b, 8290e and 8290f associated with transmitter 8202b being preferably provided via paths 8333, 8334 and 8336, respectively. An ODD line enable signal is provided via path 8335 as an output signal which is the line enable H signal output of data select 8246 which is provided from gate 8337 of data select 8247. If, however, as mentioned above, only the presently preferred single transmitter 8202a is utilized, this ODD signal as well as data select 8246 is omitted.

Figure 13:
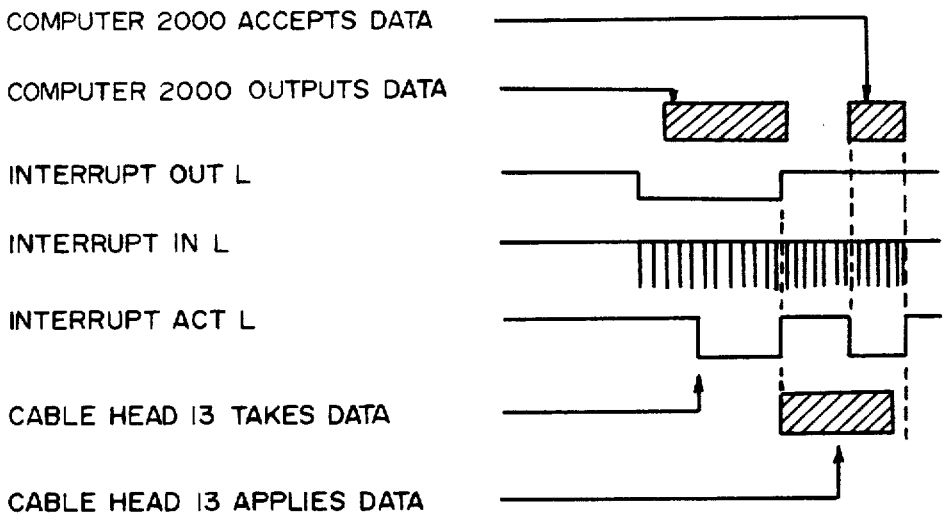
FIG. 13 comprises a timing diagram graphic illustration of the various waveforms present in the cable head portion of the system of FIG. 1 except for the waveforms of FIGS. 5A through 5C.

Referring now to FIGS. 5A–5C, FIG. 5A shows a typical original input normal TV picture received signal of the type provided to TV monitor 8800. FIG. 5B shows a typical normal TV picture line of the preferred piggy back transmission TV field with the preferred start bit 9900 present therein, the start bit 9900 being included at the start of the picture line in place of a very small portion of the picture video. This point is preferably at the very beginning of the unblanked horizontal region and would normally be to the left of the normal TV display mask. Except for the presence of this start bit, the sync, blanking, *porch* color burst and port sections of the composite video signal are preferably identical with conventional standard television transmission standards. Lastly, FIG. 5C shows a typical digital data or pseudo video scan line of the preferred piggy back transmission TV field, shown in more detail in FIG. 13, illustrating the same preferable location in time for the preferred start bit 9900 as in the normal TV picture line of FIG. 5B.

Typical Transmitter Portion–Detailed Description

Figure 8:
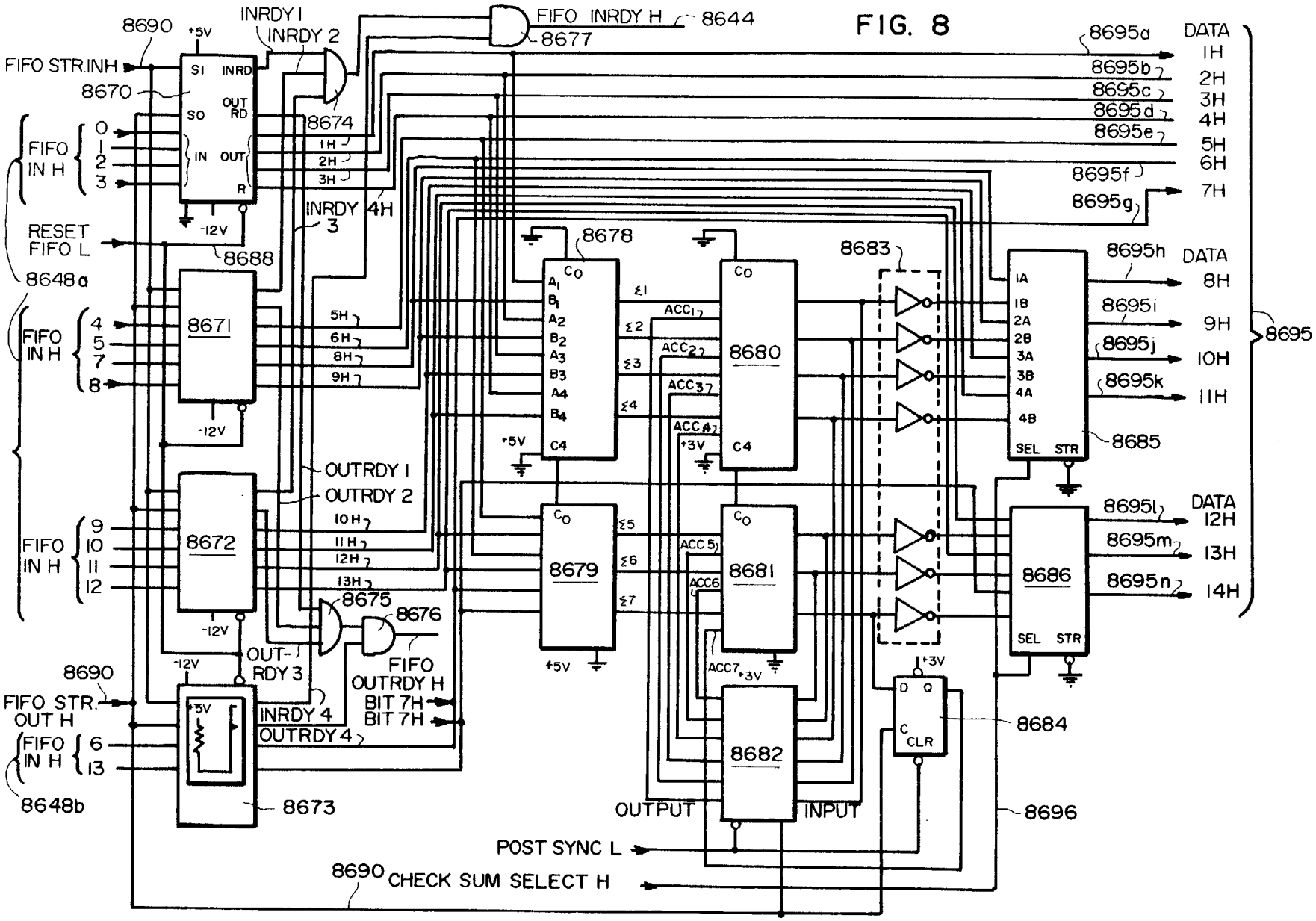
Figure 9:
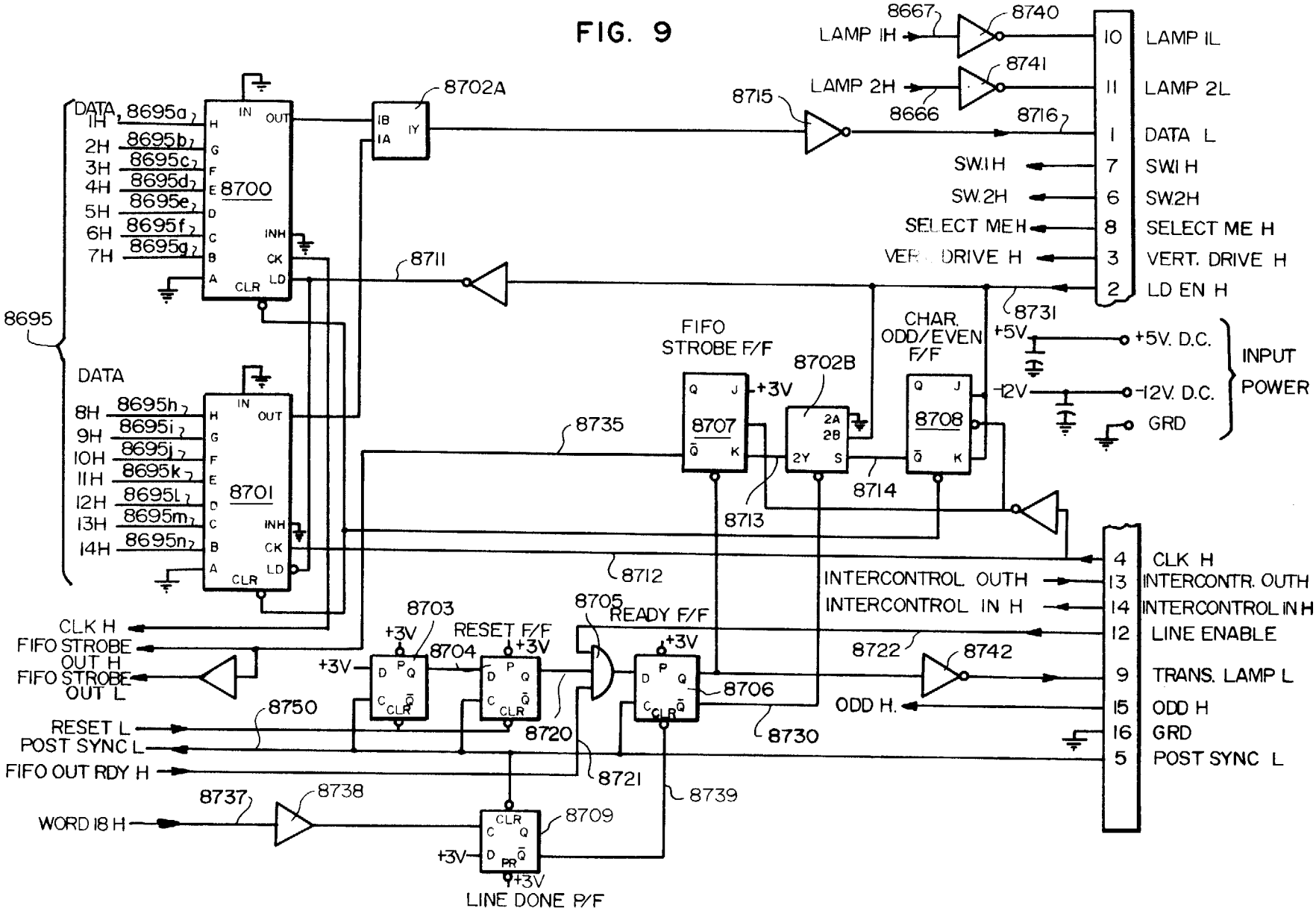

Referring now to FIGS. 7 through 9, the typical preferred transmitter portion 8202a of the preferred cable head 13 of the present invention shown in block in FIG. 1 for providing the pseudo video scan line portion of the piggy back transmission TV field shall now be described in greater detail. As previously mentioned, if a second typical preferred transmitter 8202b comprises the preferred cable head 13 in an interleaved system as opposed to the presently preferred single transmitter system, then this second transmitter 8202b will preferably be identical in function and operation with transmitter portion 8202a. FIG. 7 shows those portions of the transmitter circuit 8202a which receive data from the conventional computer 2000a connectors 8640 shown illustratively in two parts labeled 8640a and 8640b, respectively which interconnect the transmitter 8202a with the associated computer 2000a. This connector 8640 is used for both the input and output lines. Data from the computer 2000a is preferably fed on parallel lines in either a 12 bit or a 14 bit configuration depending on which type of computer is utilized. Integrated circuits 8601 through 8604 which are conventional line transceiver circuits are provided and serve to receive data from the computer 2000a or to transmit data back to the computer 2000a depending upon which mode the transmitter 8202a is operating in. As was previously described, data transfer takes place in either of two modes; one mode is a direct memory access mode where data is fed continuously at maximum rate from the computer 2000a memory unit directly to the transmitter 8202a and the other mode is the status transfer mode which is utilized primarily for single word reverse direction. In both modes certain control and acknowledgement signals are preferably required between the computer 2000a and the transmitter 8202a to establish valid times for receiving and returning data in either mode.

Considering first the direct memory access mode, a control signal from the computer 2000a is preferably applied to an inverter 8608 to initiate this mode of operation. This signal is preferably asserted when the computer 2000a is ready to transmit data by direct memory access. A NAND gate 8605 is provided which is an enabling gate which receives the ready command from an inverter 8608 and also has a second enabling input provided thereto from the transmitter 8202a first in-first out buffer via path 8644. This circuit will be described in greater detail hereinafter, but suffice it to say at this time that this line must be asserted before data can be received by the transmitter 8202a. A third input is preferably provided to gate 8605 from a pair of inverters 8610 and 8611 which are connected to the computer 2000a along a path which is always asserted at the time that data break is initiated and serves to terminate the data break at the proper time. With all enabling input condition at gate 8605 met, the output of the gate 8605 preferably falls to a low level which is provided to the D input type flip-flop 8606. This flip-flop 8606 is preferably clocked by the transmitter 8202a data clock and, accordingly, the output of the flip-flop 8606 falls at the initiation of the next clock pulse. Similarly, a following flip-flop 8607 preferably responds to the next succeeding clock pulse and its output is asserted at that time. This output signal is transmitted via an inverter 8609 back to the computer 2000a as an acknowledgement that the ready status of the computer 2000a has been received and, furthermore, that the transmitter 8202a is ready to accept data. The sequence of events that then follows is that the computer 2000a applies valid data to the data line received by line transceivers 8601 through 8604. At this time the control line 8643 preferably sets the line transceivers 8601 through 8604 in their received state. In this state, the line transceivers 8601 through 8604 preferably pass data from the input to output lines which are then applied to the input of the first in-first out buffer which will be described in greater detail hereinafter. Returning once again to the control circuit, and specifically to gate 8605, once data has been strobed into the first in-first out buffer the FIFO IN ready line 8644 drops to a low level. Preferably, after two clock delays, the acknowledgement signal to the computer 2000a has returned via inverter 8609 and is returned to its original state. This signifies that the first data word has been received by the transmitter 8202a. A second cycle of control command acknowledgement and data word reception then follows, preferably exactly in the manner described above for the first word. This process continues as long as the computer 2000a remains in its direct memory access mode. At the completion of the data break, the DONE line from the computer 2000a, which is applied to inverter 8610, signifies that the data break has been completed and disables gate 8605. This terminates the direct memory access mode.

Control of the other mode, that is status transfer is accomplished by the interconnection between the transmitter 8202a and the computer 2000a shown at 8640b. This operation is preferably initiated by the INTERRUPT OUT line from the computer 2000a applied to an inverter 8614 being asserted. As a result of this assertion, another inverter 8615 presets a flip-flop 8618 and a NOR gate 8616 clears another flip-flop 8617. Flip-flop 8617 is connected to the clock input of a flip-flop 8618 which in its preset state enables a gate 8622 which permits the data clock which is applied to the other input of that gate 8622 to be applied to the computer 2000a via the INTERRUPT IN line via an inverter 8263. Transmission of this train of clock pulses from the transmitter 8202a to the computer 2000a is the transmitter's 8202a acknowledgement to the INTERRUPT OUT command. Preferably, at this time the computer 2000a applies a status word to the data input lines applied to transceivers 8601 through 8604. A control line 8643, which is connected to the output of flip-flop 8617, is preferably still in the state which sets the line transceivers 8601 through 8604 in the receive mode. Thus, the transceivers 8601 through 8604 make available at their output the status word and this word is applied to the inputs of conventional latches 8612 and 8613. After a short time has passed sufficient to insure that the data lines have stabilized, the computer 2000a asserts the INTERRUPT ACTIVE line going to the transmitter 8202a and received therein at an inverter 8619. The output of the inverter 8619 is preferably applied to the D input of another D type flip-flop 8620 so that at the initiation of the next subsequent clock pulse the output of that flip-flop 8620 is asserted enabling a gate 8621 whose output then drops to its low state; the output of gate 8621 being fed as the strobe input to the latches 8612 and 8613, the data applied to the latches 8612 and 8613 preferably being strobed into the latches 8612 and 8613 at the falling edge of this signal. The data remains at the output of the latches 8612 and 8613 preferably until at some later time when the status word reception cycle is repeated. At this time both the INTERRUPT ACTIVE line and the INTERRUPT OUT line applied to inverters 8614 and 8619 are preferably returned to their original state under control of the computer 2000a program. This completes the status work output transfer from the computer 2000a.

Preferably, automatically and immediately following a status word output transfer from the computer 2000a, a status input transfer is accomplished. This is accomplished as follows. On the next clock pulse following return of the INTERRUPT ACTIVE line to its original state, the output flip-flop 8620 is set at a high level. This transition applied to the clock input of flip-flop 8617 causes the output of flip-flop 8617 to chage state; that is, to go from a high to a low level. This low level is preferably applied to the control line 8643 of the input transceivers 8601 throug 8604 to set them in the transmit mode. In this state, the line transceivers 8601 through 8604 connect their data input line 8648a and 8648b to the computer 2000a data bus through connector 8640a. The origin of these lines which provide the output status word will be described in greater detail hereinafter. Suffice it to say at this time that we have thus far described how, under the direct memory access mode, data is received from the computer 2000a and applied to the FIFO input lines 8648; that during a status output transfer the computer 2000a output status word is latched into buffers 8612 and 8613; and that during a status input transfer to the computer 2000a, the data on lines 8646 is applied to the computer 2000a data bus. It should be noted that line transceiver 8601 is preferably utilized only when the transmitter 8202a is fed from a 16 bit computer; when a 12 bit computer is utilized instead for computer 2000a, transceivers 8602 through 8604 process the 12 bits and line transceiver 8601 is not needed. Furthermore, when a 12 bit computer is utilized, one 12 bit word is preferably utilized to transfer two 6 bit characters. The transmitter 8202a preferably has the capability of operating with 7 bit characters. A unique feature of the pseudo video scan line transmission portion of the present invention is that it provides a capability to generate a seventh bit for at least certain characters by use of the status word. This feature generally is useful only when it is desired to set the seventh bit of some character at a value and to leave it at the same value for a very large number of consecutive character transmissions. This is precisely the situation that is often required for setting up a seventh bit for group addresses and for special characters in the row grabbing system described in the aforementioned copending U.S. patent application. , *now U.S. Pat. No. 4,042,958* The particular bits which are used for seventh bit generation are preferably connected from the status word latches 8612 and 8613 to a multiplexer 8627 and are preferably selected by the multiplexer 8627 to be made available at the correct time at the output of the multiplexer 8627.

Now describing the circuit components that do the word counting as necessary to control the multiplexer 8627. One of the preferred basic functions of the transmitter 8202a is to format the words received by the computer 2000a into serial output data packets which contain 38 characters. These packets comprise the data content of the pseudo video scan line or lines portion of the piggy back transmission TV field. Since the first in-first out buffer is preferably loaded with words which consist of two characters each, it is necessary to preferably count 19 outputs of the FIFO to determine the completion of one data packet. Conventional word counters 8626, 8628 and 8629 accomplish this counting. At the beginning of any television scan line all counters 8626, 8628 and 8629 are cleared by the post-sync pulse provided via path 8648. Everytime a word is transferred out of the FIFOs, a clock pulse is made available for the counters 8626, 8628 and 8629 on line 8649. When counter 8626 is set at count 0, that is its initial condition, multiplexer 8626 preferably selects the C O input line from the plurality of input 8651 to counter 8627 and applies it to one output 8653 thereof. At the same time, it selects the C O input to counter 8627 from the plurality of inputs 8652 and applies it to the 8654 output line. Preferably, when the first word has been strobed out of the FIFO, counter 8626 advances to count 1 and the multiplexer 8627 selects line C 1 of plurality 8651 to be connected to output 8653 and selects also line C 1 of plurality 8652 to be applied to output line 8654. This process continues up to a count of 3 when, at the same time a gate 8625 applies a low level to the enabling inputs of counter 8226 and halts its counting operation until it is recleared at the start of the next television scan line. As a result, the multiplexer inputs C 3 of 8651 and 8652 are connected to the two output lines 8653 and 8654, respectively, for the remainder of the television scan line. As a result of these connections, it is possible for the computer 2000a to establish unique bit assignments for the seventh bit of each of the initial address characters and to establish a fixed bit assignment for all of the data characters. Odd and even data characters 7 bits, however, are preferably selected separately so that the result is that the seventh bit of all odd data characters will have one value and the seventh bit of all even data characters will have a value which may be the same or different as that of the odd characters. The remaining circuit components shown in FIG. 7 are preferably utilized to establish initialization and reset conditions, such as the input circuit to an inverter 8637 which, with a subsequent inverter 8638, is utilized to provide a negative initialization pulse when power is first turned on. As a result, initialization pulses are made available at the output of inverter 8638, at the output of a gate 8636 and at the output of a NOR gate 8633. Means is also provided for a reset pulse to be generated under computer 2000a control. This is accomplished during data output transfer by the computer 2000a setting the bit of the status word that ends up on line 8653 applied to NAND gate 8635. As a result of the signal on line 8661, a reset pulse is generated by NAND gate 8635 during every status transfer, during which time the other input to gate 8635 also goes high. Thus, as long as the line 8661 remains high, reset pulses will be continuously generated. Normally the status word is preferably set to cause a reset on one status transfer, a reset pulse having been created thereby as previously mentioned, the reset bit being cleared on the next subsequent status word transfer. The reset pulse from gate 8635 preferably causes a FIFO reset from gate 8636 and causes flip-flop 8634 to be cleared. With flip-flop 8634 cleared, a reset assertion is made at the output of gate 8632 and appears at the output of gate 8633 as a master reset pulse labeled RESET L. This particular reset pulse is preferably removed at the start of the next vertical drive period by flip-flop 8634 which is preferably clocked to its set state at the start of the vertical drive pulse provided at the clock input of flip-flop 8634. A slightly different form of reset under computer 2000a control is preferably accomplished when the computer 2000a sets the bit of the status word associated with line 8660. With this bit set, gate 8624 applies a negative reset pulse to gate 8632 during every status word transfer. In similar manner, in the previously described reset mode, a reset negative level is preferably provided at the output of NOR gate 8633. In this case, the reset is under direct control of the status word bit, whereas when the reset was generated by flip-flop 8634, the reset condition once started was maintained until the start of a vertical drive pulse. The reset associated with flip-flop 8634 is preferably utilized when it is specifically desired to halt transmission of data characters and to resume transmission at the start of the next vertical field. The status output bits labeled, respectively, INTERCONTROL OUT H, LAMP 2H, and LAMP 1H, on lines 8665 through 8667, respectively, are preferably utilized for signal indication and control purposes which will be described in greater detail hereinafter.

Referring now to FIG. 8, character input data is preferably applied via lines 8648a and 8648b to FIFOs 8670 through 8673. The FIFOs 8670 through 8573 are initially cleared by the reset line 8688. Data is strobed into the FIFOs 8670 through 8673 by the FIFO strobe line 8690 which is generated by flip-flop 8607 (FIG. 7). The FIFOs 8670 through 8673 preferably have capacity for storing 64 words. After the FIFOs through 8673 have been cleared and at least one word has been strobed in, data shortly becomes abailable at the FIFO output line. Availability of data at the output is signalled by the OUTPUT READY lines which are connected to gates 8675 and 8676. Thus, a high level at the output of gate 8676 indicates that all FIFOs 8607 through 8673 have valid output data available. Similarly, each FIFO 8670 through 8673 has a line which indicates that its input is ready to receive data. The INPUT READY lines are preferably connected to gates 8674 and 8677 such that the output of gate 8677 is high when the inputs of the FIFOs 8670 through 8673 are ready to receive data. The function of the INPUT READY high line 8644 was previously described in relation to the portion of the transmitter 8202a shown in FIG. 7.

The circuits consisting of components 8678 through 8686 are preferably utilized for the purpose of computing and inserting a check sum at the end of a data packet. These circuits 8678 and 8679 are preferably conventional binary adders which are connected to add two 7 bit numbers. The bits of one number are preferably connected to the A inputs and the bits of the other number are preferably connected to the B inputs. The 7 bit sum is then available at the output lines. The units are preferably connected so a carry is correctly propagated from the least significant bit to the most significant bit; however, no carry output is generated. As shown and preferred, the adders 8678 and 8679 add together the two 7 bit characters which are always available at the 14 bit output lines of the FIFOs 8670 and 8673. Thus to start with, characters 1 is added to character 2 to make their sum available at the output; then, after the next word is available at the FIFOs 8670 through 8673, character 3 is added to character 4, and so forth. This operation preferably continues for the duration of each data packet. Circuits 8680 and 8681 are also preferably binary adder circuits identical to adders 8678 and 8679. These adders 8680 and 8681 add the previous sum made available by adders 8678 and 8679 to another 7 bit number which preferably comes from a conventional storage latch 8682. For the purpose of discussion it is assumed initially that the output of latch 8682 is zero. In that case, the summation outputs of adders 8680 and 8681 are the same as the input values. Thus as the time just prior to the strobing of characters 2 and 3 out of the FIFOs, the sum of characters 1 and 2 is available at the output of adders 8680 and 8682. At the occurrence of the first FIFO strobe output on line 8690, two things happen simultaneously. First, the output of adders 8680 and 8681, namely the sum of the first two characters, are latched into buffer latch 8682 and made available at the output line of that circuit 8682. Then, the second and third characters are made available at the output of the FIFOs 8670 through 8673. As a result, at this time, connected to the input of adders 8680 and 8681, are the summation of characters 1 and 2 on one set of inputs and the summation of characters 3 and 4 on the other set of inputs. This results in, at the output of these adders 8680 and 8681, the presence of the total summation of characters 1, 2, 3 and 4. Thus, as the line progresses, at all times available at the output of adders 8680 and 8681 is the total accumulated sum of all characters transmitted up to that point. Preferably, after [characreters] *characters* 37 and 38 have been strobed out of the FIFOs, the output of adders 8681 and 8681 represents the check sum of the 38 characters processed up until that time [Acutally] *Actually*, as presently preferred, the last data character is character number 37. However, since characters are preferably handled in pairs, a dummy 38th character is included in the addition but the computer 2000a sets that dummy character to a value of zero. Thus, the summation represents the addition of characters 1 through 37. A plurality of inverters 8683 preferably form the ones complement of the check sum and provide it at the input lines of conventional multiplexers 8685 and 8686. These multiplexers 8685 and 8686 preferably serve to switch these check sum lines onto the output data lines in place of the FIFO data at the precise time necessary for the check sum to be picked up as the 38th output character. As a result, the 14 output lines 8695a through 8695n represent the character pairs necessary to form the proper final output data including the check sum. The switching of these multiplexers 8685 and 8686 is preferably accomplished by the control line 8696 labeled CHECK SUM SELECT H. This line 8696 is preferably asserted at the 18th count of the word counter 8629 (FIG. 7) which signal would then be present at the output of gate 8631 (FIG. 7).

Referring now to FIG. 9, conventional shift registers 8700 and 8701 are preferably provided to convert the 14 bit parallel input data provided via lines 8695a–8695n into serial data as necessary for final transmission. A negative pulse on line 8711 which preferably occurs once per character, preferably latches the parallel input data provided via 8695a–8695n into the shift registers 8700 and 8701. This data is then preferably shifted out serially under control of the 5.1 megaherz system clock provided via line 8712. A conventional multiplexer 8702, illustratively shown in two sections 8702a and 8702b is provided, with section 8702a connecting the output data line alternatively to the output of one or the other of the shift registers 8700 or 8701. The multiplexer 8702 is preferably switched at the character rate by control line 8714 which is shown connected as the control input to the other section 8702b of the multiplexer 8702. The output data from section 8702a is preferably connected to an inverter 8715 which makes the final output data available on line 8716. The other circuits shown in FIG. 9 are preferably utilized to generate control waveforms necessary to operate the various circuits of the transmitter 8202a already described. Flip-flops 8703 and 8704 are preferably provided to generate an initial delay after the FIFOs 8670 through 8673 first have data available. Inasmuch as data is preferably shifted out at a fixed rate for one television scan line period of the piggy back transmission TV field, preferably it is desired to insure that the FIFOs are adequately loaded with data before a line transmission is initiated. Flip-flops 8703 and 8704 thus provide an initial delay after reset equivalent to two television scan line periods which is an adequate time to insure that the computer 2000a has loaded the FIFOs 8670 through 8673 with adequate data. A three input gate 8705 is provided which tests its input lines 8720, 8721 and 8722 to determine if all conditions are met for initiating the transmission of a data packet. If the system is still in reset, as indicated by a signal present on line 8720, if the FIFOs output are not ready as indicated by a signal present on line 8721, or if the LINE ENABLE is not asserted on line 8722, the output of gate 8705 will be low and the system will be inhibited from transmitting a data packet. The aforementioned LINE ENABLE line 8722 is the one that is directly connected to the picture select circuit 8807 in the presently preferred single transmitter system, and, if a two transmitter interleaved system is utilized, it is the one that selects which of the two transmitters 8202a or 8202b is used for a particular television scan line.

When all conditions necessary to transmission are present, the output of gate 8705 goes high and at the trailing edge of the next post-sync pulse, provided via line 8648, flip-flop 8706 is set. This flip-flop 8706 preferably initiates a transmission sequence by removing the clear condition from the shift registers 8700 and 8701 and from flip-flops 8707 and 8708, the FIFO flip-flops, and the character ODD/EVEN flip-flop. One output of flip-flop 8706 preferably enables the multiplexer 8702b via path 8730. Flip-flop 8708 is preferably toggled at the character rate to generate the select input for multiplexer 8702 on control line 8714. The LOAD ENABLE waveform is connected to both the J and the K inputs of J-K flip-flop 8708 via line 8731. This pulse on path 8731 is preferably one clock period long. Thus, the flip-flop 8708 is toggled at the negative clock transition which occurs during the LOAD ENABLE pulse. The output of flip-flop 8708 provided via line 8714 is preferably high during odd character periods and low during even character periods. One input of multiplexer section 8702b is preferably connected to the LOAD ENABLE line 8731 while the other input is grounded. Therefore, the output of this multiplexer section 8702b which is provided via line 8713 consists of alternate LOAD ENABLE pulses. Thus, output line 8713 is preferably connected to the K input of flip-flop 8707. As a result, the output of flip-flop 8707, which is provided via line 8735, is set high at the completion of the last bit of each odd character and remains high during the first bit of the subsequent even character. Thus, this line 8735 is high during the first bit of even characters 2, 4, 6, etc., and is low at all other times.

Preferably, at the completion of an active television scan line associated with the portion of the piggy back transmission TV field assigned to the pseudo video scan line or lines, the transmit sequence is terminated by the word 18 pulse which is provided via line 8737. This is preferably applied to the clock input of the LINE DRIVE flip-flop 8709 via an inverter 8738. As a result, at the completion of word 18, flip-flop 8709 is set and its output provided via path 8739 goes low, clearing the READY flip-flop 8706. The output of flip-flop 8706 then returns to its original quiescent state. It should be noted that in the preferred exmple being described herein, the completion of the word 18 pulse corresponds to the completion of dummy character number 40. This is because the word 18 pulse actually is present during words 18 and 19, and as shown in FIG. 11, the completion of word count 19 preferably occurs when characters 39 and 40 are present at the FIFOs output.

As further shown and preferred in FIG. 9, inverters 8740, 8741 and 8742 are provided as lamp drivers to provide power to the signal indicator lamps via signals LAMP 1L, LAMP 2 L, and TRANS. LAMP L, respectively.

As was previously mentioned, the function and operation of transmitter portion 8202b is preferably identical with that described above with reference to the function and operation of transmitter portion 8202a, described in detail above. As was also previously mentioned, these transmitter portions 8202a and 8202b preferably provide serial data unidirectionally to the master combiner synchronizer 8204 as well as receiving and transmitting bidirectional status and control signals to the master combiner synchronizer 8204. The output of the master combiner sychronizer 8204, which was previously described in detail with reference to FIGS. 3 and 4, is the composite video signal and a separate color burst signal both of which are provided to the output network 8206, as shown and preferred in FIG. 1. The function and operation of this output network 8206 for providing a well defined controllably distorted output signal of the type represented by the waveform illustrated in FIGS. 12C and 12E for the pseudeo video scan line portion of the piggy back transmission TV field shall now be described in greater detail hereinafter with reference to FIGS. 10 and 12A through 12E, the pre-equalization filter 8207, as was previously mentioned, preferably being disabled during the normal TV video portion of the piggy back transmission TV field by the disable signal provided via path 8804.

Pre-Post Equalization of a CATV Channel

As was previously described in the commonly owned copending U.S. patent application "Improved Row Grabbing System," filed Sept. 10, 1975 and bearing U.S. Ser. No. 611,843, *now U.S. Pat. No. 4,042,958*, and as particularly illustrated in FIGS. 21A through 21C thereof, data to the receiver terminal 28a or 28b present in a pseudo video scan line may contain significant distortion resulting from conventional vestigal sideband modulation schemes utilized for the preferred CATV transmission as well as from phase delay distortion present in any cable or CATV transmission system and the bandwidth limitations inherent in the FCC channel allocations. These distortions generally occur in any television transmission. and are not normally compensated for due to the low level fidelity requirements of conventional normal TV television transmission and display and, accordingly, pre-equalization filter 8207 is disabled during such transmission. The nature of these types of distortions was described in the aformentioned U.S. patent application, *now U.S. Pat. No. 4,042,958*, and illustrated in FIGS. 21A and 21C therefore. FCC channel allocations normally provide for equalization with respect to conventional television transmission; however, this equalization is not sufficient for the type of digital data transmission which is accomplished by the pseudo video scan line portion of the preferred piggy back transmission of the present invention and, thus, the aforementioned distortions occur in such portion of the piggy back transmission TV field. The preferred equalization system of the present invention which, as will be described in greater detail hereinafter, preferably takes place in the output network 8206, as well as in the preferred RF demodulator/equalizers 8850a and 8850b which are preferably identical channel type dedicated equalizers, omits the need for the distortion compensation circuit of the type described in the aforementioned U.S. patent application, *now U.S. Pat. No. 4,042,958*, for the pseudo video scan line portion of the piggy back transmission TV field.

Figure 10:
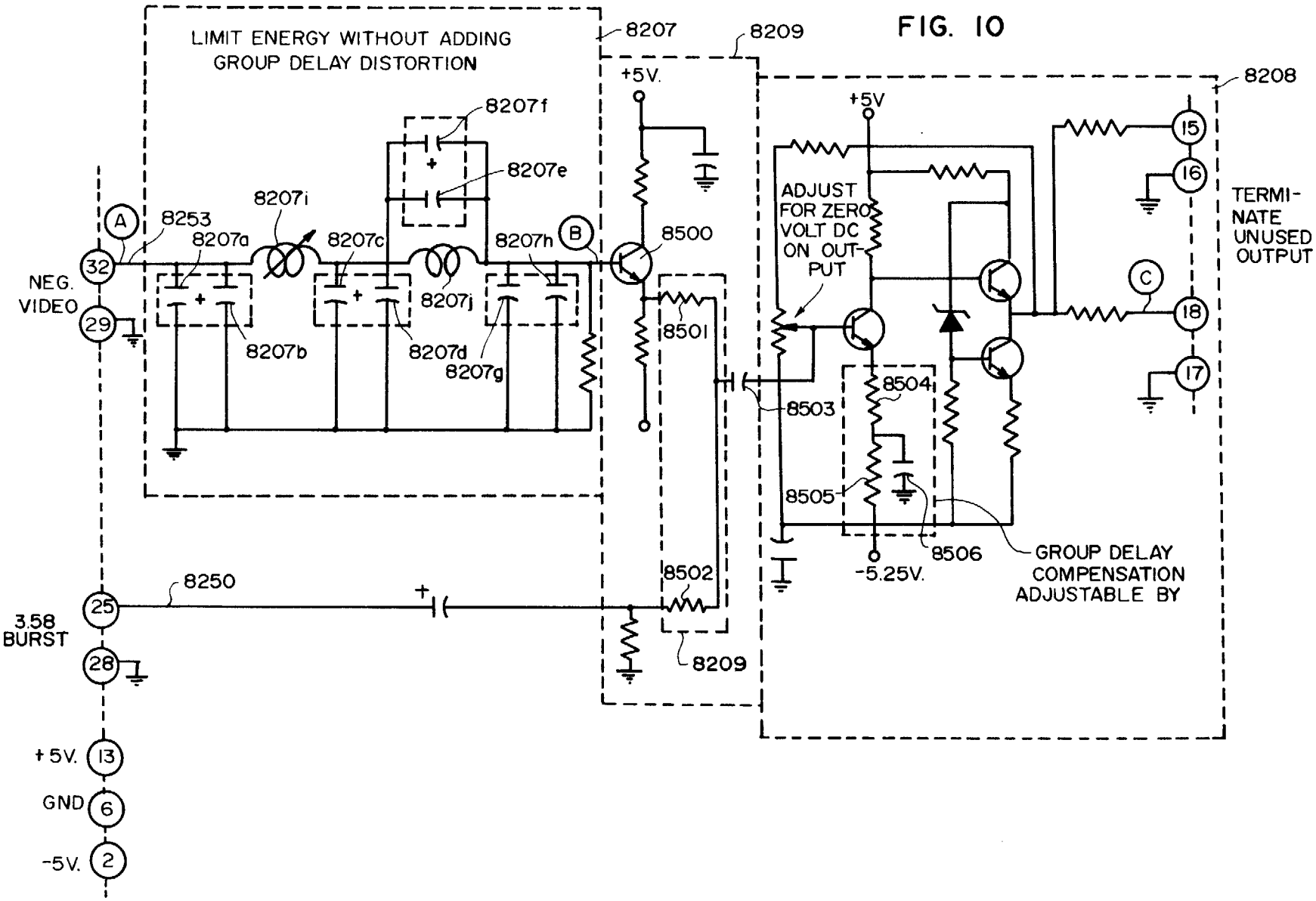
FIG. 10 is a schematic diagram of the output network of FIG. 1.
Figure 12:
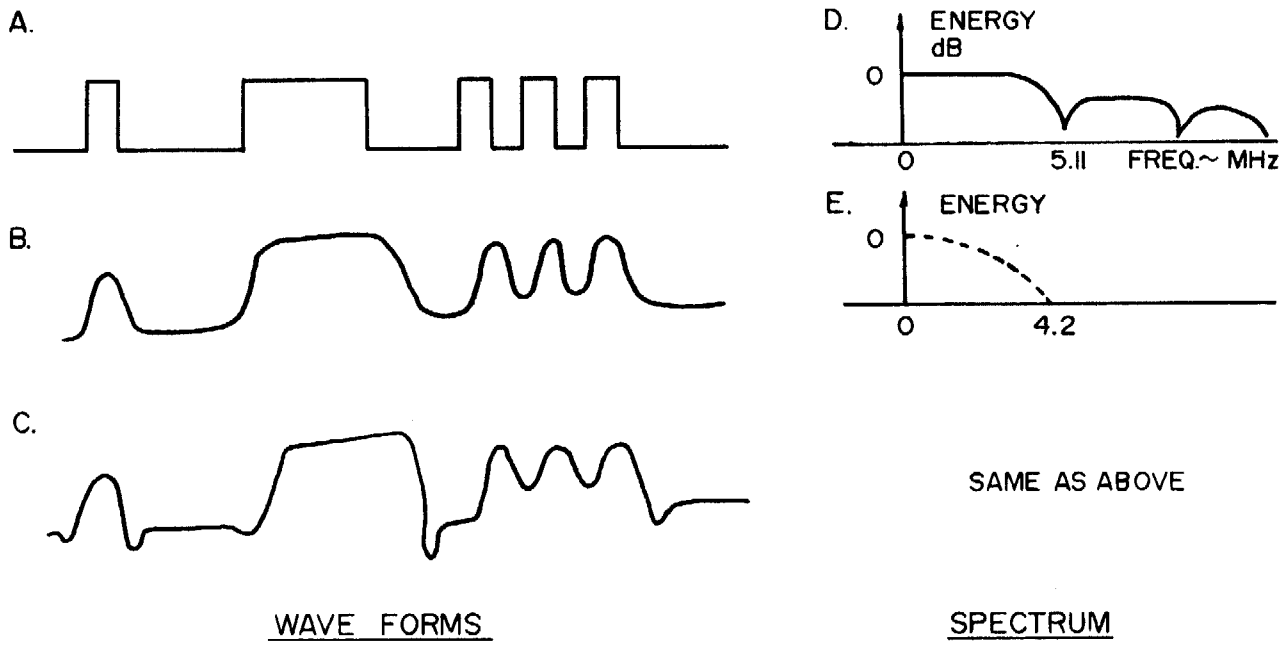
FIGS. 12A through 12E comprise a timing diagram of graphic illustrations of the various waveforms and their associated energy distributions present in the output network of FIG. 10.

Referring now to FIGS. 10 and 12A through 12E, the output network 8206 shown in block in FIG. 1, shall now be described in greater detail with reference to the schematic of FIG. 10. The illustrations of the various exemplary waveforms present throughout the output network 8206 shown in detail in FIG. 10 are showns in FIGS. 12A through 12E. FIGS. 12A through 12C refer to the various exemplary waveforms present at points A, B and C (FIG. 10), respectively, in the output network 8206. FIG. 12D refers to the exemplary energy distribution of the waveform illustrated in FIG. 12A and FIG. 12E refers to the exemplary energy distribution of the waveforms illustrated in FIGS. 12B and 12C, the energy distribution of the waveforms illustrated in FIG. 12C being the same as that of the wavefrom illustrated in FIG. 12B. The preferred pre-equalization filter network 8207 is preferably utilized in output network 8206 to limit the energy content of the composite video input data signal, illustratively represented by the waveform of FIG. 12A, and provided via path 8253 to filter 8207 at point A, without adding any significant group delay distortion. This pre-equalization filter 8207 produces an output signal at point B from the input waveform of FIG. 12A which output signal is represented by FIG. 12B. The waveform of FIG. 12B preferably has an energy distribution of the form illustrated in FIG. 12E. Thus, as can be seen by comparing FIG. 12D, the energy distribution of the input waveform of FIG. 12A, and FIG. 12E, the energy distribution of the output waveform of FIG. 12B, the energy distribution of the signal provided at the output of pre-equalization filter 8207 is preferably brought well within the restriction of the CATV transmission system being utilized. Thus, this signal present at the output of filter 8207 will not be significantly distorted by the CATV transmission system utilized with respect to the band limiting distortions which would normally occur in the absence of the pre-equalization filtering function of filter 8207. As shown and preferred in FIG. 12B, this output signal as compared to the input waveform of FIG. 12A is a controllably distorted digital signal well defined in accordance with the characteristics of the preferred filter network 8207 to be described in greater detail hereinafter.

As shown and preferred in FIG. 10, the output of the preferred filter network 8207 is provided to the base of a buffer amplifier 8500, which is preferably a conventional transistor amplifier, which prevents overloading of filter 8207 in conventional fashion. This buffer amplifier 8500 preferably feeds one input to mixer or summing network 8209 such as one preferably comprising resistors 8501 and 8502, with the other input to the mixing network 8209 preferably being the color burst signal provided via path 8250 through resistor 8502. The output of the summing network 8209 is preferably provided through a capacitor 8503 which conventionally provides AC coupling into the AC coupled output amplifier comprising the video driver 8208. Amplifier or video driver 8208, preferably contains a group delay equalizing network comprising resistors 8504, 8505 and capacitor 8506. Network 8504–8505–8506 preferably compensates for any distortion introduced by envelope detection of vestigal sideband TV demodulation. Thus, network 8504–8505–8506 preferably introduces the specific type of distortion required for the RF demodulator/equalizer 8850a and 8850b used for a given channel in the CATV transmission system utilized. The output of the video driver 8208 which is illustratively represented by the waveform of FIG. 12C, thus preferably contains further controllable distortions therein. These further controllable distortions which are now preferably present in the waveform of FIG. 12C, when passed through the cable TV television distribution system in which signal distortions of the type which normally result from the vestigal sideband modulation and demodulation process occur, and through the RF demodulator/equalizer 8850a and 8850b associated with the channel, result in the waveform of the type illustrated in FIG. 12B at the output of the RF demodulator/equalizer 8850a or 8850b. Thus, when the distortions which normally occur due to this vestigal sideband modulation and demodulation occur on or are combined with the signal of the type illustrated in the waveform of FIG. 12C, it preferably results in the output waveform illustrated in FIG. 12B at the output of the preferred RF demodulator/equalizer 8850a and 8850b. The configuration of the preferred video amplifier or driver 8208 is preferably a conventional video amplifier of the type utilized in a television distribution system but which has been modified to the extent previously described with reference to the network of 8504–8505–8506. The aforementioned filter network 8207 is preferably a conventional $\sin^2$ filter configuration with the values being chosen so as to preferably limit the energy without adding group delay distortion, as previously mentioned. These values are typically, by way of example, 370 $\mu f$ for the sum of capacitors 8207a and 8207b, 2000 $\mu f$ for the sum of capacitors 8207c and 8207d, 272 $\mu f$ for the sum of capacitors 8207e and 8207f, 250 $\mu f$ for the sum of capacitors 8207g and 8207h, 5.5 to 8.4 $\mu h$ for variable inductor 8207i and 1,8 $\mu h$ for inductor 8207j, and produce a half pulse response whose half amplitude duration is preferably, by way of example, 147 nanoseconds. Thus, output network 8206 as a result of the functioning of filter 8207 and the functioning of network 8504–8505–8506 in video driver 8208, preferably provides a well defined controllably distorted output at point C, illustratively represented by waveform FIG. 12C having a well defined controlled energy distribution, illustratively represented by FIG. 12E, which is well within the capabilities of a standard CATV television distribution system, so that any distortions which might normally occur in the signal, provided to the CATV distribution system resulting from the use of such a pseudo video scan line transmission system are compensated for.

It should be noted that unless otherwise indicated in the specification, all circuitry components are preferably conventional although the overall system of the present invention as well as the utilization of such circuitry for the preferred transmission scheme is not conventional.

It is to be understood that the above described embodiments of the invention are merely illustrative of the principles thereof and that numerous modifications and embodiments of the invention may be derived within the spirit and scope thereof.

What is claimed is:

1. a common channel video communication system for providing a television field comprising a plurality of television video scan lines over said common channel, said television field being comprised of both at least one video displayable row of video data characters contained in a pseudo video scan line occupying one of said plurality of television scan lines and normal televison video displayable information occupying the balance of said plurality of television video scan lines; said system comprising means for providing said television video scan lines comprising said normal television video information; means for providing said pseudo video scan line; and means operatively connected to said normal television video information providing means and said pseudo video scan line providing means for combining said normal television video information television video scan lines and said pseudo video scan line for providing said television field over said common channel, said pseudo video scan line providing means comprising means for providing said pseudo video scan line having a television video scan line format and capable of comprising a complete self-contained packet of digital information sufficient to provide said one row as an entire displayable row of video data characters, said displayable one row comprising a plurality of television video scan lines, said pseudo video scan line having an associated transmission time equivalent to said television video scan line, said packet of digital information comprising at least address information for said displayable one row and data information for said displayable characters in said displayable one row, said displayable one row being capable of providing a continuous video display of a selectable grabbed row of video information comprising said video data characters on a video display means from continuously transmittable video information[.] *said system further comprising television signal distribution means for distributing said provided television field over said common channel to said video display means for providing at least said grabbed row continuous video display and receiver means operatively connected between said common channel television signal distribution means and said video display means for processing said distributed television field and capable of providing a displayable video row signal corresponding to said displayable one row to said video display means from said one composite pseudo video scan line output signal for providing said continuous video display, said receiver means comprising means for updating said grabbed displayable row as said data portion of said displayable received distributed pseudo video scan line portion of said television field is updated.*

2. A system in accordance with claim 1 wherein said combining means comprises means for interleaving said television video scan lines comprising said normal television video information with said pseudo video scan line for providing an in phase composite combined interleaved television field to said common channel as said common channel television field.

3. A system in accordance with claim 1 wherein said normal television video displayable information has an associated video display mask comprising said balance of said plurality of television video scan lines and said combining means comprises means for interleaving said television video scan lines comprising said normal television video information with said pseudo video scan line for providing said pseudo video scan line outside said associated video display mask, whereby said one displayable row is not viewable in said video display mask.

4. A system in accordance with claim 3 wherein said interleaving means comprises means for providing said pseudo video scan line at the bottom of said television field.

5. A system in accordance with claim 1 wherein said normal television video information providing means comprises means for receiving a normal composite video signal containing composite sync information and said normal television video information and means operatively connected between said receiving means and said combining means for separating said composite sync information from said normal television video information for separately providing said composite sync information and said normal television video information to said combining means.

6. A system in accordance with claim 5 wherein said combining means comprises phase locked loop means responsive to said separated composite sync information and said provided pseudo video scan line for interleaving said television video scan lines comprising said normal television video information with said pseudo video scan line for providing an in phase composite combined interleaved television field to said common channel as said common channel television field.

7. A system in accordance with claim 1 wherein said combining means comprises means for providing a video black signal for said one television video scan line of said television field when said pseudo video scan line is not provided to said combining means.

8. A system in accordance with claim 1 wherein said combining means comprises means for providing a composite video scan line output signal comprising sync information for each of said plurality of television video scan lines comprising said television field.

9. A system in accordance with claim 8 wherein said composite video scan line output signal providing means comprises means for providing a horizontal sync signal at the beginning of said composite pseudo video scan line output signal, said horizontal sync signal providing a record separator between adjacently provided composite pseudo video scan lines.

10. A system in accordance with claim 9 wherein said composite video scan line output signal providing means further comprises means for inserting a start bit pulse at the beginning of said composite pseudo video scan line output signal between said horizontal sync signal and said packet of digital information, said system further comprising television signal distribution means for distributing said provided television field over said common channel to said video display means for providing at least said grabbed row continuous video display and receiver means operatively connected between said common channel television signal distribution means and said video display means for processing said distributed television field and capable of providing a displayable video row signal corresponding to said displayable one row to said video display means from said one composite pseudo video scan line output signal for providing said continuous video display, said start bit pulse providing a unique synchronizing pulse for said pseudo video scan line for enabling precise determination of a sampling time for the received distributed one pseudo video scan line to enable accurate determination of the binary state of the bits comprising said digital information packet, said receiver signal processing means comprising means responsive to the occurrence of said start bit for providing a reset signal for resetting said processing means in response to detection of said start bit, whereby noise immunity and accurate signal information are enhanced.

11. A system in accordance with claim 10 wherein said one composite pseudo [vidoe] *video* scan line output signal provided by said combining means in said provided television field comprises a three level signal having first, second and third signal levels with said digital data information and said start bit pulse varying between said second and third signal levels, and said horizontal sync signal information being provided between said first and second signal levels.

[12. A system in accordance with claim 10 wherein said receiver means comprises means for updating said grabbed displayable row dependent on the real time data information content of said received pseudo video scan line.]

13. A system in accordance with claim [12] *10* wherein said updating means comprises memory means for retrievably storing said continuously distributed pseudo video scan line data information portion for providing said displayable video row therefrom, said memory means retrievably stored data information portion being continuously updateable as said data information portion of said pseudo scan line output signal associated therewith is updated.

14. A system in accordance with claim 10 wherein said start bit pulse insertion means further comprises means for inserting said start bit pulse at the beginning of each of said composite video scan line output signals, said receiver signal processing means further comprising gating means responsive to each of said composite video scan line output signals for providing only said data information content of said composite video scan line output signals corresponding to said pseudo video scan line output signal for further processing for providing said displayable video row while providing each of said start bit pulses to said start bit responsive means, whereby said reset signal is provided for each of said plurality of television video scan lines comprising said television field.

[15. A system in accordance with claim 1 wherein said system further comprises television signal distribution means for distributing said provided television field over said common channel to said video display means for providing at least said grabbed row continuous video display and receiver means operatively connected between said common channel television signal distribution means and said video display means for processing said distributed television field and capable of providing a displayable video row signal corresponding to said displayable one row to said video display means from said one composite pseudo video scan line output signal for providing said continuous video display.]

[16. A system in accordance with claim 15 wherein said receiver means comprises meand for updating said grabbed displayable row dependent on the real time data information content of said received pseudo video scan line.]

17. A system in accordance with claim [16] *1* wherein said updating means comprises memory means for retrievably storing said continuously distributed pseudo video scan line data information portion for providing said displayable video row therefrom, said memory means retrievably stored data information portion being continuously updateable as said data information portion of said psuedo video scan line associated therewith is updated.

18. A system in accordance with claim 1 wherein said system further comprises means for providing a continuous video display of a selectable predetermined video frame of information on said video display means for said continuously transmittable video information, said video frame comprising a plurality of said displayable rows including said one displayable row, and means for transmitting said continuously transmittable video information as a plurality of said pseudo video scan lines, said combining means comprising means for providing a plurality of said television fields over said common channel, said pseudo video scan line content of a plurality of said television fields comprising said video frame displayable rows.

19. A system in accordance with claim 18 wherein said combining means comprises means for providing a composite video scan line output signal comprising sync information for each of said plurality of television video scan lines comprising each of said television fields.

20. A system in accordance with claim 19 wherein said composite video scan line output signal providing means comprises means for providing a horizontal sync signal at the beginning of said composite pseudo video scan line output signal, said horizontal sync signal providing a record separator between adjacently provided composite pseudo video scan lines.

21. A system in accordance with claim 18 wherein said [system further comprises] television signal distribution means *comprises means* for distributing said provided television fields over said common channel to said video display means for providing said video frame continuous display [and], *said* receiver means [operatively connected between said common channel television signal distribution means and said video display] *processing means comprising* means for processing said distributed television fields and capable of providing a displayable video row signal corresponding to each of said displayable rows to said video display means from each of said corresponding pseudo video scan lines in said [pluraliy] *plurality* of television fields for providing said continuous video frame display.

22. A system in accordance with claim 21 wherein said [receiver] *updating* means comprises means for updating said continuous video frame display on a displayable video row-by-row basis [dependent on the real time data information content] *as said data portion of any* of said received *distributed* pseudo video scan lines *pertaining to said selected frame is updated.*

23. A system in accordance with claim 22 wherein said updating means comprises memory means for retrievably storing said continuously distributed pseudo video scan line data information portion for providing said displayable video row therefrom, said memory means retrievably stored data information portion being continuously updateable as said data information portion of said pseudo video scanline associated therewith is updated.

24. A system in accordance with claim 1 wherein [said system further comprises television signal disribution means for distributing said provided television field over said common channel to said video display means,] said video display means [comprising] *comprises* first and second means for separately video displaying said grabbed video displayable row information content of said television field on said first display means and said normal television video information content of said television field on said second display means, said [system further comprising] receiver means *being* operatively connected between said common channel television distribution means and said first and second display means for processing said distributed television field for providing displayable video signals to said first and second display means from said received television field for providing said separate video displays.

*25. A common channel video communication system for providing a television field comprising a plurality of television video scan lines over said common channel, said television field being comprised of both at least one video displayable row of video data characters contained in a pseudo video scan line occupying one of said plurality of television video scan lines and normal television video displayable information occupying the balance of said plurality of television video scan lines; said system comprising means for providing said television video scan lines comprising said normal television video information; means for providing said pseudo video scan line; and means operatively connected to said normal television video information providing means and said pseudo video scan line providing means for combining said normal television video information television video scan lines and said pseudo video scan line for providing said television field over said common channel, said pseudo video scan line providing means comprising means for providing said psuedo video scan line having a television video scan line format and capable of comprising a complete self-contained packet of digital information sufficient to provide said one row as an entire displayable row of video data characters, said displayable one row comprising a plurality of television video scan lines, said pseudo video scan line having an associated transmission time equivalent to said television video scan line, said packet of digital information comprising at least address information for said displayable one row and data information for said displayable characters in said displayable one row, said displayable one row being capable of providing a continuous video display of a selectable grabbed row of video information comprising said video data characters on a video display means from continuously transmittable video information distributed thereto, said system comprising means for processing said composite pseudo video scan line and capable of providing a displayable video row signal to said video display means from said pseudo video scan line pertaining to said grabbed row for providing said continuous video display thereof, said processing means comprising means for updating said continuously video displayable selectable row as said data portion of said displayable received distributed pseudo video scan line pertaining to said selected row is updated.*

*26. A common channel video communication system for providing a television field comprising a plurality of television video scan lines over said common channel, said television field being comprised of both at least one video displayable row of video data characters contained in a pseudo video scan line occupying one of said plurality of television scan lines and normal television video displayable information occupying the balance of said plurality of television video scan lines; said system comprising means for providing said television video scan lines comprising said normal television video information; means for providing said pseudo video scan line; and means operatively connected to said normal television video information providing means and said pseudo video scan line providing means for combining said normal television video information television video scan lines and said pseudo video scan line for providing said television field over said common channel, said pseudo video scan line providing means comprising means for providing said pseudo video scan line having a television video scan line format and capable of comprising a complete self-contained packet of digital information sufficient to provide said one row as an entire displayable row of video data characters, said displayable one row comprising a*

*plurality of television video scan lines, said pseudo video scan line having an associated transmission time equivalent to said television video scan line, said packet of digital information comprising at least address information for said displayable one row and data information for said displayable characters in said displayable one row, said displayable one row being capable of providing a continuous video display of a selectable grabbed row of video information comprising said video data characters on a video display means from continuously transmittable video information said system further comprising television signal distribution means for distributing said provided television field over said common channel to said video display means for providing at least said grabbed row continuous video display and receiver means operatively connected between said common channel television signal distribution means and said video display means for processing said distributed television field and capable of providing a displayable video row signal corresponding to said displayable one row to said video display means from said one composite pseudo video scan line output signal for providing said continuous video display, said receiver means comprising means for updating said grabbed displayable row as said data portion of said displayable received distributed pseudo video scan line portion of said television field is updated said combining means comrising means for providing a composite video scan line output signal comprising sync information for each of said plurality of television video scan lines comprising said television field, said composite video scan line output signal providing means comprising means for providing a horizontal sync signal at the beginning of said composite pseudo video scan line output signal, said horizontal sync signal providing a record separator between adjacently provided composite video scan lines, said composite video scan line output signal providing means further comprising means for inserting a start bit pulse at the beginning of said composite pseudo video scan line output signal between said horizontal sync signal and said packet of digital information, said system further comprising television signal distribution means for distributing said provided television field over said common channel to said video display means for providing at least said grabbed row continuous video display and receiver means operatively connected between said common channel television signal distribution means and said video display means for processing said distributed television field and capable of providing a displayable video row signal corresponding to said displayable one row to said video display means from said one composite pseudo video scan line output signal for providing said continuous video display, said start bit pulse providing a unique synchronizing pulse for said pseudo video scan line for enabling precise determination of a sampling time for the received distributed one pseudo video scan line to enable accurate determination of the binary state of the bits comprising said digital information packet, said receiver signal processing means comprising means responsive to the occurrence of said start bit and said horizontal sync signal for providing a reset signal for resetting said processing means in response to detection of said start bit for enhancing immunity of said system to any noise or jitter present in said horizontal sync signal, whereby noise immunity and accurate signal information are enhanced.*

*27. A common channel video communication system in accordance with claim 25 wherein said updating means comprises memory means for retrievably storing said continuously distributed pseudo video scan line data information portion for providing said displayable video row therefrom, said memory means retrievably stored data information portion being continuously updateable as said data information portion of said pseudo video scan line associated therewith is updated.*

*28. A common channel video communication system for providing a television field comprising a plurality of television video scan lines over said common channel, said television field being comprised of both at least one video displayable row of video data characters contained in a pseudo video scan line occupying one of aid plurality of television scan lines and normal television video displayable information occupying the balance of said plurality of television video scan lines; said system comprising means for providing said television video scan lines comprising said normal television video information; means for providing said pseudo video scan line; and means operatively connected to said normal television video information providing means and said pseudo video scan line providing means for combining said normal television video information television video scan lines and said pseudo video scan line for providing said television field over said common channel, said pseudo video scan line providing scan line having a television video scan line format and capable of comprising a complete self-contained packet of digital information sufficient to provide said one row as an entire displayable row of video data characters, said displayable one row comprising a plurality of television video scan lines, and pseudo video scan line having an associated transmission time equivalent to said television video scan line, said packet of digital information comprising at least address information for said displayable one row and data information for said displayable characters in said dsiplayable one row, said displayable one row being capable of providing a continuous video display of a selectable grabbed row of video information comprising said video data characters on a video data characters on a video display means from continuously transmittable video information, said system further comprising television signal distribution means for distributing said provided television field over said common channel to said video display means, said video display means comprising first and second means for separately video displaying said grabbed video displayable row information content of said television field on said first display means and said normal television video information content of said television field on said second display means, said system further comprising receiver means operatively connected between said common channel television distribution means and said first and second display means for processing said distributed television field for providing displayable video signal to said first and second display means from said received television field for providing said separate video displays.*

*29. A common channel video communication system in accordance with claim 28 wherein said receiver means comprising means for updating said grabbed displayable row as said data portion of said displayable received distributed pseudo video scan line portion of said television field is updated.*

* * * * *